(12) United States Patent
Miyazawa et al.

(10) Patent No.: US 9,560,637 B2
(45) Date of Patent: Jan. 31, 2017

(54) MANAGEMENT APPARATUS AND COMMUNICATION SYSTEM

(71) Applicant: YOKOGAWA ELECTRIC CORPORATION, Musashino-shi, Tokyo (JP)

(72) Inventors: Kazunori Miyazawa, Tokyo (JP); Yukiyo Akisada, Tokyo (JP); Yasuki Sakurai, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 117 days.

(21) Appl. No.: 14/388,629

(22) PCT Filed: Apr. 10, 2013

(86) PCT No.: PCT/JP2013/060824
§ 371 (c)(1),
(2) Date: Sep. 26, 2014

(87) PCT Pub. No.: WO2013/157460
PCT Pub. Date: Oct. 24, 2013

(65) Prior Publication Data
US 2015/0055637 A1 Feb. 26, 2015

(30) Foreign Application Priority Data
Apr. 18, 2012 (JP) ................. 2012-094948

(51) Int. Cl.
*H04J 3/16* (2006.01)
*H04W 72/04* (2009.01)
(Continued)

(52) U.S. Cl.
CPC ........ *H04W 72/0406* (2013.01); *H04J 3/1694* (2013.01); *H04W 28/16* (2013.01); *H04W 88/10* (2013.01); *H04W 4/001* (2013.01)

(58) Field of Classification Search
None
See application file for complete search history.

(56) References Cited

U.S. PATENT DOCUMENTS

2005/0213516 A1* 9/2005 Ramirez .............. H04B 1/0003
370/254
2007/0286102 A1* 12/2007 Shimokawa .......... H04W 74/08
370/310
(Continued)

FOREIGN PATENT DOCUMENTS

JP 2011-515044 A 5/2011

OTHER PUBLICATIONS

"ISA-100.11a-2009 Wireless systems for industrial automation: Process control and related applications", pp. 249-314.
(Continued)

*Primary Examiner* — Chi H Pham
*Assistant Examiner* — Soon-Dong D Hyun
(74) *Attorney, Agent, or Firm* — Sughrue Mion, PLLC

(57) ABSTRACT

A management apparatus, which manages a wireless network constituted by a plurality of wireless communication devices each capable of performing a wireless communication using TDMA system, is characterized by comprising an extended link management unit that manages an extended link obtained by setting, to a link for which a channel and time slots to be used for wireless communications using the TDMA system are specified and for which a communication direction is determined, attribute information that characterizes the wireless communications performed by the wireless communication devices by use of the link.

8 Claims, 21 Drawing Sheets

(51) Int. Cl.
*H04W 88/10* (2009.01)
*H04W 28/16* (2009.01)
*H04W 4/00* (2009.01)

(56) References Cited

U.S. PATENT DOCUMENTS

| | | | | |
|---|---|---|---|---|
| 2008/0311945 A1* | 12/2008 | Balo | ............... | H04W 72/005 455/518 |
| 2009/0316628 A1* | 12/2009 | Enns | ............ | H04L 12/40006 370/328 |
| 2010/0144357 A1* | 6/2010 | Chaudhri | ......... | H04W 72/0406 455/450 |
| 2011/0007699 A1 | 1/2011 | Moon et al. | | |
| 2011/0110291 A1 | 5/2011 | Ishii | | |
| 2013/0021167 A1* | 1/2013 | Harper, Jr. | ............ | G05B 9/02 340/870.01 |

OTHER PUBLICATIONS

International Search Report for PCT/JP2013/060824 dated Jul. 2, 2013.

* cited by examiner

FIG. 5A

| Device Type ID | Support protocols | Occupy Timeslot | Protocol Switching margin | Number of subnets | Wireless I/F | Number of Wireless I/F | Default property |
|---|---|---|---|---|---|---|---|
| Device X | ISA100.11a, WirelessHART | 10ms | 20ms | 1 | 2.4GHz | 1 | Property X |
| Device Y | ISA100.11a, WirelessHART | 10ms | 10ms | 2 | 2.4GHz | 2 | Property Y |
| Device Z | ISA100.11a | 10ms | 0 | 1 | 2.4GHz | 1 | None |

FIG. 5B

| Owner Device ID | Peer Device ID | Direction | Protocol | Timeslot Start | Cycle | Duration | Channel | Property Group |
|---|---|---|---|---|---|---|---|---|
| 20a | Any | Tx | ISA100.11a | Offset | 3 | 10ms | 14 | 1 |
| 20a | Any | Tx | ISA100.11a | Offset | 7 | 10ms | 15 | 1 |
| ANY | 20a | Rx | ISA100.11a | Offset | 3 | 10ms | 14 | 1 |

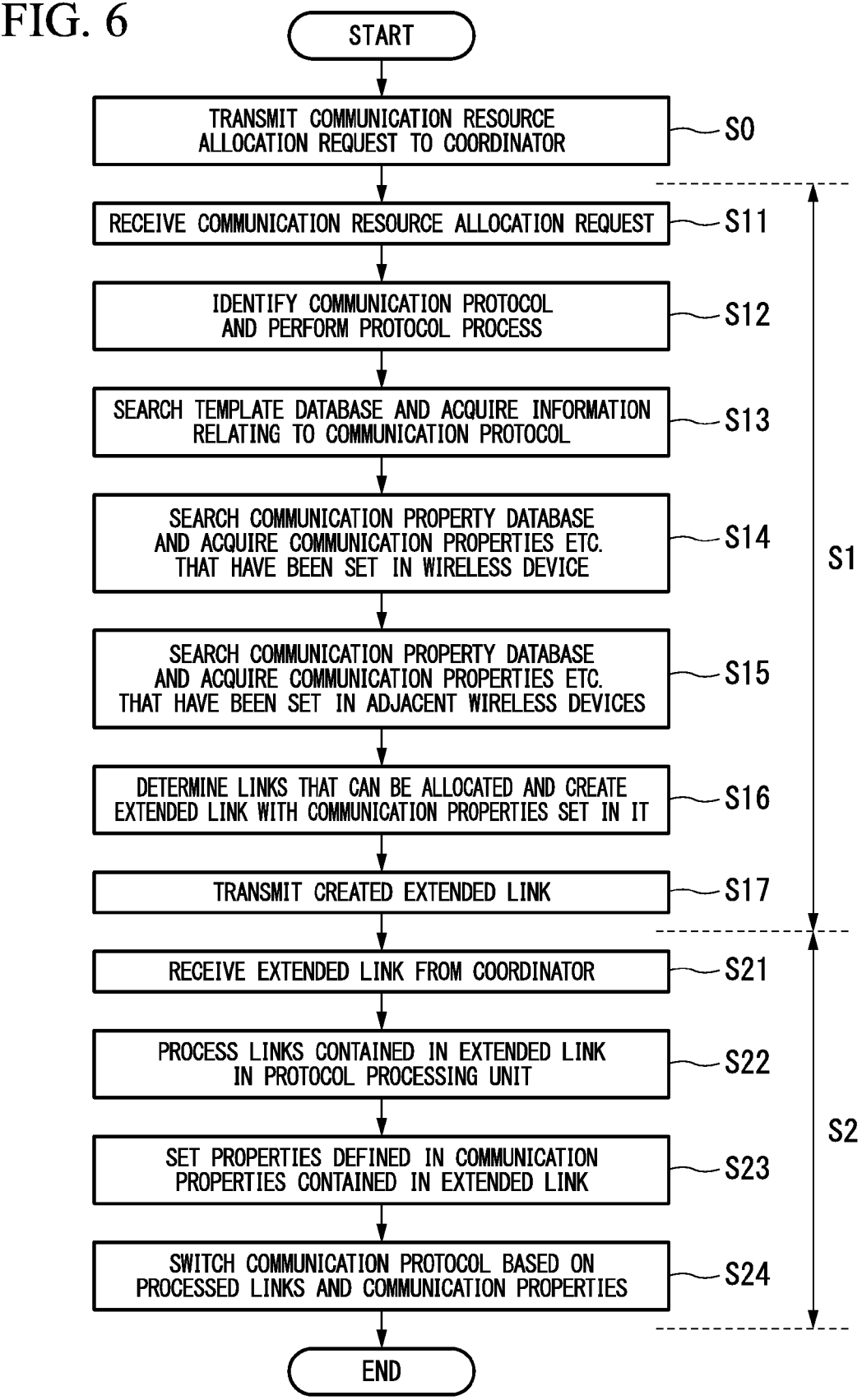

FIG. 14

| Owner Device ID | Peer Device ID | Direction | Protocol | MAC | Timeslot Start | Cycle | Duration | Channel | Property Group |
|---|---|---|---|---|---|---|---|---|---|
| 20a | Any | Tx | ISA100.11a | 15.4 | Offset | 3 | 10ms | 14 | 1 |
| 20a | Any | Tx | ISA100.11a | 15.4e | Offset | 7 | 10ms | 15 | 1 |
| ANY | 20a | Rx | ISA100.11a | 15.4 | Offset | 3 | 10ms | 14 | 1 |

FIG. 15

| Owner Device ID | Peer Device ID | Direction | Protocol | Timeslot Start | Cycle | Duration | Freq | Channel | Property Group |
|---|---|---|---|---|---|---|---|---|---|
| 20a | Any | Tx | ISA100.11a | Offset | 3 | 10ms | 2.4GHz | 14 | 1 |
| 20a | Any | Tx | ISA100.11a | Offset | 7 | 10ms | 915MHz | 15 | 1 |
| ANY | 20a | Rx | ISA100.11a | Offset | 3 | 10ms | 2.4GHz | 14 | 1 |

FIG. 21

| Owner Device ID | Peer Device ID | Direction | Protocol | DL Key | Timeslot Start | Cycle | Duration | Channel | Property Group |
|---|---|---|---|---|---|---|---|---|---|
| 13c | 20b | Tx | ISA100.11a | Key A | Offset | 3 | 10ms | 14 | 1 |
| 13c | 11e | Tx | ISA100.11a | Key A | Offset | 7 | 10ms | 15 | 1 |
| 13c | 12b | Tx | ISA100.11a | Key B | Offset | 3 | 10ms | 14 | 1 |

MANAGEMENT APPARATUS AND COMMUNICATION SYSTEM

TECHNICAL FIELD

The present invention relates to a management apparatus and a communication system.

Priority is claimed on Japanese Patent Applications No. 2012-094948, filed Apr. 18, 2012, the content of which is incorporated herein by reference.

BACKGROUND ART

To achieve a high degree of automation at plants, factories, and such like, it is conventional to construct a distributed control system (DCS), in which devices known as field devices such as measuring devices and manipulating devices, and a control device for controlling them, are connected via a communication means. While most of the communication systems that form the foundation of such distributed control systems use wire communication, recently, some are being realized using wireless communication compliant with wireless communication standards for industrial automation, such as ISA100.11a and WirelessHART (Registered Trademark).

ISA100.11a is a wireless communication standard for industrial automation established by the International Society of Automation (ISA). WirelessHART (Registered Trademark) is a wireless communication standard established by the US Highway Addressable Remote Transducer (HART) Communications Foundation. Communication systems compliant with these wireless communication standards use time division multiple access (TDMA) as a media access control method, and provide a management apparatus known as a system manager (or a network manager) for managing the communication resources such as channels and timeslots in the TDMA.

This communication system is characterized in that, since the management apparatus mentioned above manages the communication resources, multi-hop connection is possible in addition to single-hop connection. In a single-hop connection, a wireless device (e.g. a field device capable of wireless communication) and a wireless relay device (e.g. a backbone router or a wireless access point device) are connected directly. In a multi-hop connection, the wireless device is connected to the wireless relay device via another wireless device.

The communication system described above is characterized in that connection information managed by the management apparatus (information for connecting a new wireless device to the wireless network) is supplied as advertisements from an advertisement router, thereby making it easy to connect a new wireless device to the wireless network. The non-patent document 1 discloses a method of managing communication resources in ISA100.11a.

PRIOR ART DOCUMENTS

Non-Patent Documents

[Non-Patent Document 1] "ISA-100.11a-2009 Wireless systems for industrial automation: Process control and related applications", p. 249-314

DISCLOSURE OF INVENTION

Problems to be Solved by the Invention

Although ISA100.11a and WirelessHART (Registered Trademark) have many similarities, communication systems compliant with these standards are currently constructed independently from each other. This is because the management apparatuses provided in these communication systems manage the communication resources with absolutely no consideration for wireless networks implemented in other communication systems. Consequently, when a communication system compliant with ISA100.11a (hereinafter 'first communication system') and a communication system compliant with WirelessHART (Registered Trademark) (hereinafter 'second communication system') are both provided at, for example, a plant, in providing the wireless devices, wireless relay devices, backbone routers, and the like used in each of the communication systems, there is a constraint that, in a state of spatial division, the communication systems must be constructed separately.

Due to this constraint, wireless devices, wireless relay devices, backbone routers, and the like must be provided separately for each of the first and second communication systems, leading to cost problems. Also, when, for example, the second communication system has been constructed, if there is a need to use a special wireless device that can only handle a communication protocol used in the first communication system, the first communication system must be newly constructed just to use that wireless device, incurring a huge cost. Also, when wanting to make a transition from, for example, the second communication system to the first communication system, while a gradual shift is preferable in terms of cost, due to the constraint mentioned above the shift must be made all at once, incurring a huge cost all at once.

Conceivably, if dual stack technology were utilized so that communication protocols used in the first communication system and communication protocols used in the second communication system could both be handled by the wireless communication devices, the constraint mentioned above could be eliminated. However, in the first and second communication systems, since various processes such as transmitting and receiving must be completed within the timeslots managed by the management apparatuses, the packet frame is set to the smallest possible frame length. It is therefore difficult to provide a new field to store information for identifying communication protocols in the packet frame. Trying all the possible communication protocols is impractical, given the need to complete processing within the timeslot. Consequently, it is difficult to eliminate the constraint.

Conceivably, if the frequency bands and channels used in the first and second communication systems were specified and kept separate, there would be no need to spatially separate the first and second communication systems and the constraint would thus be eliminated. However, when the channels used in the communication systems are specified, those channels are in an occupied state even while they are not actually being used, resulting in a problem of inefficient usage of communication resources. When the channels are specified, if the communication quality deteriorates due to changes in the surrounding circumstances, this deterioration is difficult to resolve. Conceivably, the communication resources could be used more efficiently if they were managed manually by a person. However, when the scale of the communication system increases, management becomes extremely complex, and manual management is therefore impractical.

The present invention provides a management apparatus that enables wireless communication via a wireless network even if there is a mixture of wireless communication devices having different specifications on that wireless network, and a communication system including the management apparatus.

Means for Solving the Problems

A management apparatus that manages a wireless communication network formed by a plurality of wireless communication devices capable of TDMA wireless communication, may include: an extended link management unit configured to manage extended links, in which a link that defines channels and timeslots used in the TDMA wireless communication and specifies a communication direction has been set with property information characterizing the wireless communications performed by the wireless communication devices using that link.

The property information may contain at least one of information indicating a communication protocol, a frequency channel, an antenna, a modulation, a cryptographic algorithm, and a cryptographic key, which are used in the wireless communication, information indicating the bandwidth of the wireless communication, and information indicating another wireless network to be connected to the wireless network.

The extended link management unit may include: a first database that stores information needed when setting property information for the wireless communication devices forming the wireless network; and a second database that stores property information presently set for the wireless communication devices. The extended link management unit may refer to the first and second databases in setting new property information for the wireless communication devices.

The extended link management unit may also refer to the first and second databases in setting new property information for other wireless communication devices that communicate with the wireless communication devices.

A communication system capable of wireless communication via a wireless network, may include: a management apparatus that manages a wireless communication network; and a plurality of wireless communication devices, with the property information contained in the extended links managed by the management apparatus having been set therein, the wireless communication devices performing TDMA wireless communication characterized according to the property information that has been set. The management apparatus may include an extended link management unit configured to manage extended links, in which a link that defines channels and timeslots used in the TDMA wireless communication and specifies a communication direction has been set with property information characterizing the wireless communications performed by the wireless communication devices using that link.

The communication system may further include: a wireless communication device that uses different communication protocols to advertise information needed to allow a wireless communication device that does not belong to the wireless network to join the wireless network.

The property information may contain at least one of: information indicating a communication protocol, a frequency channel, an antenna, a modulation, a cryptographic algorithm, and a cryptographic key, which are used in the wireless communication, information indicating the bandwidth of the wireless communication, and information indicating another wireless network to be connected to the wireless network.

The extended link management unit may include: a first database that stores information needed when setting property information for the wireless communication devices forming the wireless network; and a second database that stores property information presently set for the wireless communication devices. The extended link management unit may refer to the first and second databases in setting new property information for the wireless communication devices.

The extended link management unit may also refer to the first and second databases in setting new property information for other wireless communication devices that communicate with the wireless communication devices.

A management method for managing a wireless communication network formed by a plurality of wireless communication devices capable of TDMA wireless communication, may include: managing extended links, in which a link that defines channels and timeslots used in the TDMA wireless communication and specifies a communication direction has been set with property information characterizing the wireless communications performed by the wireless communication devices using that link.

The property information may contain at least one of information indicating a communication protocol, a frequency channel, an antenna, a modulation, a cryptographic algorithm, and a cryptographic key, which are used in the wireless communication, information indicating the bandwidth of the wireless communication, and information indicating another wireless network to be connected to the wireless network.

(Basic Concept of the Present Invention)

FIG. 1 is a diagram illustrating the basic concept of the present invention. As shown in FIG. 1, the present invention uses an extended link EL, formed by extending a conventional link NL used in TDMA wireless communication and setting property information characterizing the wireless communication (hereinafter 'communication properties') CP on the link NL, thereby making it possible to perform wireless communication via the wireless network even if there is a mixture of wireless communication devices having different specifications on the wireless network.

The conventional link NL defines a channel CH and a timeslot TS, and specifies a communication direction (TX/RX). In addition to the communication direction (TX/RX) specified in the link NL, the communication property CP can also contain at least one of information indicating a communication protocol, a frequency channel, an antenna, a modulation, a cryptographic algorithm, and a cryptographic key, which are used in the wireless communication, information indicating the bandwidth of the wireless communication, and information indicating a subnet to be connected to the wireless network.

Let us imagine a communication system including a management apparatus M that manages the extended link EL, a wireless communication device D1 that can use three communication protocols while switching between them, and a wireless communication device D2 that can only use one communication protocol. Also, let us suppose that a communication protocol compliant with, for example, ISA100.11a 2009 ('communication protocol A') can be used in a 'first upper layer' of the wireless communication devices D1 and D2, a communication protocol compliant with, for example, ISA100.11a 2011 ('communication protocol B') can be used in a 'second upper layer' of the wireless communication device D1, and a communication protocol compliant with, for example, WirelessHART (Registered Trademark) ('communication protocol C') can be used in a 'third upper layer' of the wireless communication device D1.

Let us suppose that the extended link EL1 managed by the management apparatus M contains information indicating 'communication protocol A' as the communication protocol CP1, and the extended link EL2 contains information indicating 'communication protocol C' as the communication protocol CP2. When the management apparatus M performs a process of setting the extended links EL1 and EL2 in the wireless communication device D1, the wireless communication device D1 becomes capable of wireless communication using 'communication protocol A' on the channel and in the timeslot defined in the extended link ELL and becomes capable of wireless communication using 'communication protocol C' on the channel and timeslot defined by the extended link EL2. By using the extended links in this way, the wireless communication device D1 can perform communication using a different communication protocol in each timeslot, and can perform communication using a different antenna in each timeslot.

The wireless communication device D2 can use only one communication protocol ('communication protocol A'), and the information that can be specified in the link NL is limited to the communication direction. Therefore, the management apparatus M performs a process of setting a conventional link NL (in other words, an extended link EL in which only the communication direction is set as the communication protocol) in the wireless communication device D2, while setting an extended link EL1 corresponding to the link NL1 constituting the communication property CP1 in the wireless communication device D1, thereby enabling the wireless communication devices D1 and D2 to wirelessly communicate via the wireless network N.

Effects of the Invention

According to a preferred embodiment of the present invention, an extended link management unit manages extended links, in which a link used in TDMA wireless communication has been set with property information characterizing the wireless communication performed using that link, and the wireless communication device performs wireless communication under this management. Therefore, wireless communication can be performed via the wireless network even if there is a mixture of wireless communication devices having different specifications on that wireless network.

BRIEF DESCRIPTION OF THE DRAWINGS

FIG. 5A is an example of database used in the first preferred embodiment of the present invention.

FIG. 5B is an example of database used in the first preferred embodiment of the present invention.

FIG. 6 is a flowchart illustrating an operation performed when setting a communication property in accordance with the first preferred embodiment of the present invention.

FIG. 14 is one example illustrating a communication property database used in accordance with a fourth preferred embodiment of the present invention.

FIG. 15 is a diagram illustrating one example of a communication property database used in a fifth preferred embodiment of the present invention.

FIG. 21 is a diagram illustrating one example of a communication property database used in an eighth preferred embodiment of the present invention.

EMBODIMENTS FOR CARRYING OUT THE INVENTION

Figure 1:
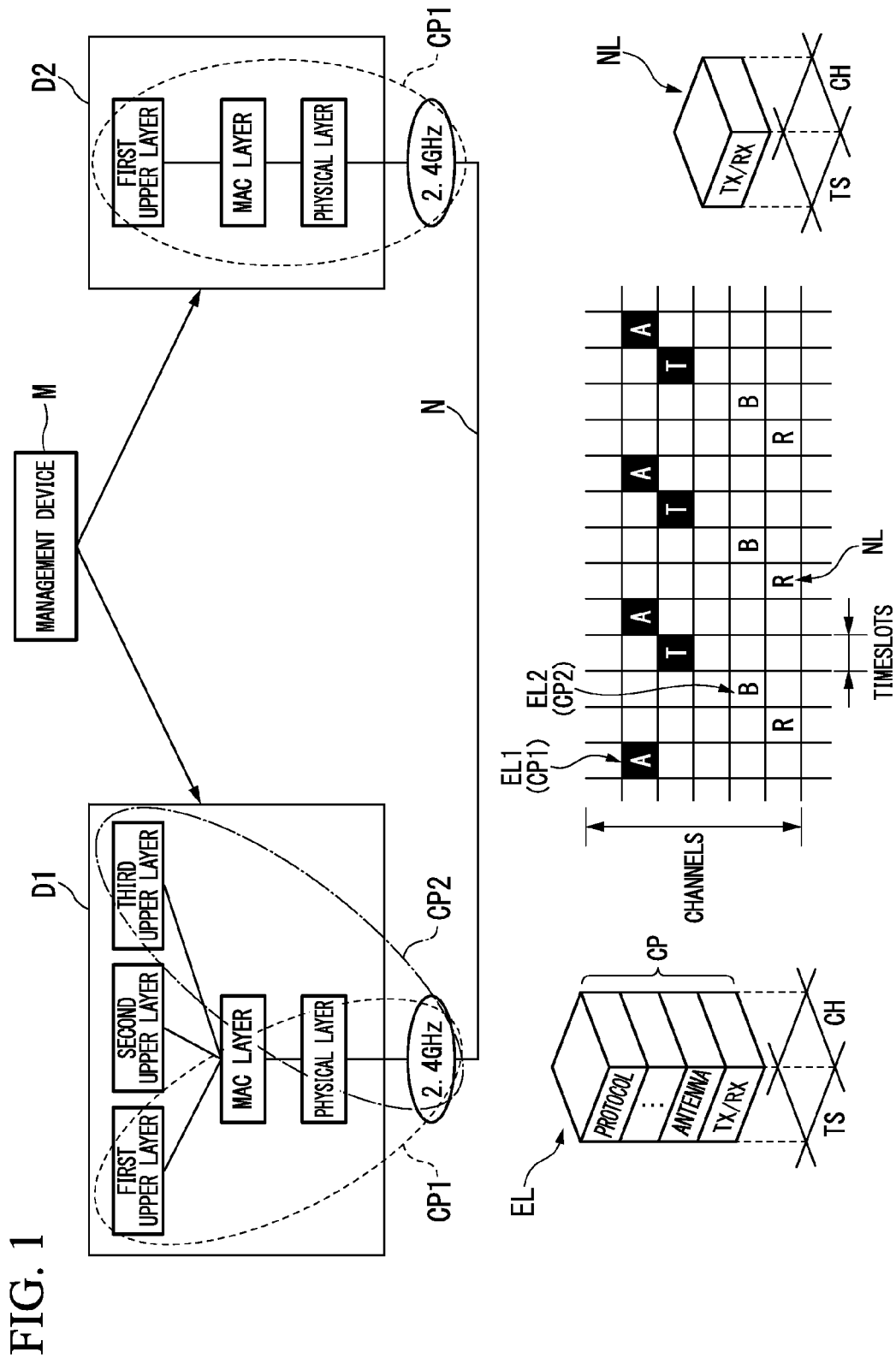
FIG. 1 is a diagram illustrating the basic concept of the present invention.

A management apparatus and a communication system in accordance with preferred embodiments of the present invention will be explained in detail while referring to the drawings.

(First Preferred Embodiment)
(Overall Configuration of Communication System)

Figure 2:
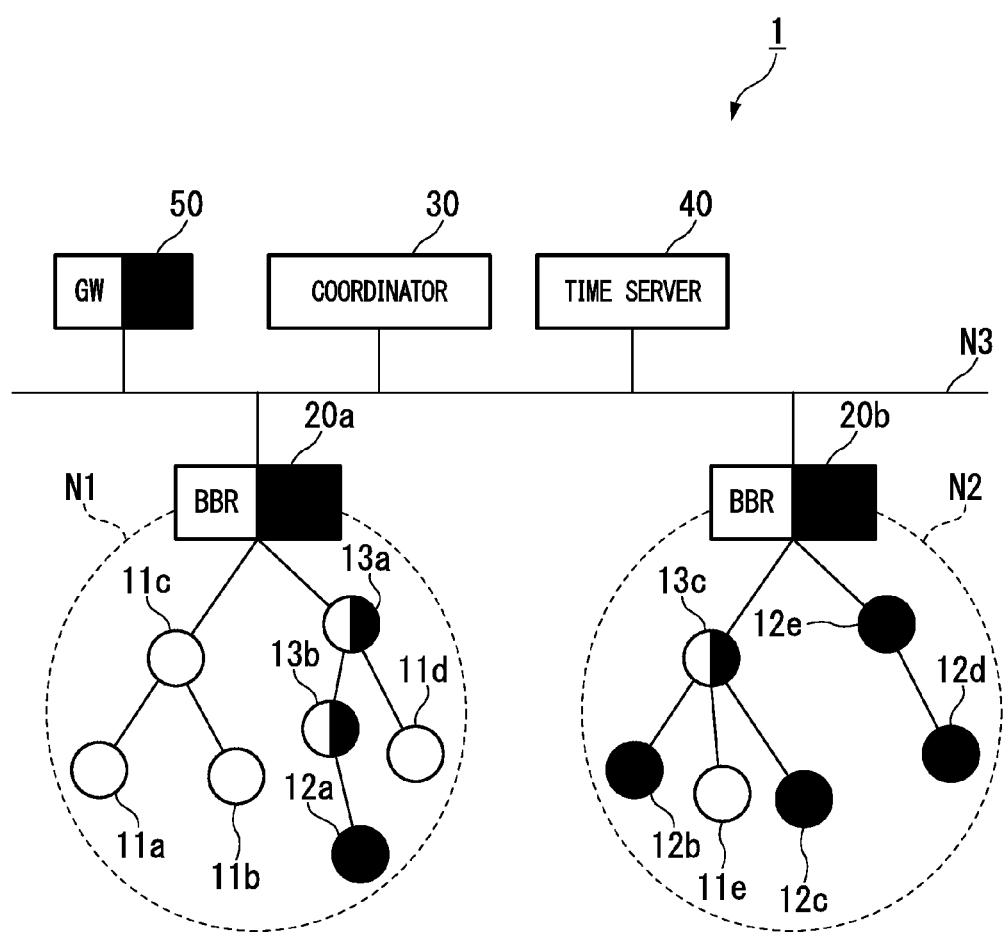
FIG. 2 is a diagram illustrating the overall configuration of a communication system in accordance with a first preferred embodiment of the present invention.

FIG. 2 is a diagram illustrating the overall configuration of a communication system in accordance with a first preferred embodiment of the present invention. As shown in FIG. 2, a communication system 1 of the first preferred embodiment includes wireless devices 11a to 11e (wireless communication devices), wireless devices 12a to 12e (wireless communication devices), convertible wireless devices 13a to 13c (wireless communication devices), backbone routers (BBR) 20a and 20b, a coordinator 30 (management apparatus), a time server 40, and a gateway device (GW) 50, and can perform wireless communication using time division multiple access (TDMA) via wireless networks N1 and N2.

In the example of FIG. 2, the wireless network N1 is formed by the wireless devices 11a to 11d, the wireless device 12a, the convertible wireless devices 13a and 13b, and the backbone router 20a, and the wireless network N2 is formed by the wireless device 11e, the wireless devices 12b to 12e, the convertible wireless device 13c, and the backbone router 20b. The number of wireless devices and convertible wireless devices forming the wireless networks N1 and N2 is arbitrary.

The wireless devices 11a to 11e, the wireless devices 12a to 12e, and the convertible wireless devices 13a to 13c are field devices installed at a plant or a factory, including, for example, sensors such as flow meters and temperature sensors, valve devices such as flow control valves and on-off valves, actuator devices such as fans and motors, and such like, and are capable of TDMA wireless communication. Here, the wireless devices 11a to 11e are capable of wireless communication compliant with ISA100.11a, and the wireless devices 12a to 12e are capable of wireless communication compliant with WirelessHART (Registered Trademark). The convertible wireless devices 13a to 13c are capable of both wireless communication compliant with ISA100.11a and wireless communication compliant with WirelessHART (Registered Trademark).

In FIG. 2, to facilitate understanding, the wireless devices 11a to 11e capable of wireless communication compliant with ISA100.11a are depicted as white circles, and the wireless devices 12a to 12e capable of wireless communication compliant with WirelessHART (Registered Trademark) are depicted as black circles. The convertible wireless devices 13a to 13c capable of both wireless communication compliant with ISA100.11a and wireless communication compliant with WirelessHART (Registered Trademark) are depicted as white-and-black circles (circles with a white left-half and a black right-half).

The backbone routers 20a and 20b are devices that connect the wireless networks N1 and N2 to a backbone network N3 which the coordinator 30, the time server 40, and the gateway device 50 are connected to, and relay data transmitted and received to and from the wireless networks N1 and N2 and the backbone network N3. Like the convertible wireless devices 13a to 13c, the backbone routers 20a and 20b are capable of both wireless communication compliant with ISA100.11a and wireless communication compliant with WirelessHART (Registered Trademark). In FIG. 2, to facilitate understanding, the backbone routers 20a and 20b are depicted as white-and-black boxes (square boxes with a white left-half and a black right-half).

In FIG. 2, the wireless devices depicted as white circles are capable of wireless communication with the other wireless devices depicted as white circles, with the convertible wireless devices depicted as white-and-black circles, and with the backbone routers depicted as white-and-black boxes. The wireless devices depicted as black circles are capable of wireless communication with the other wireless devices depicted as black circles, with the convertible wireless devices depicted as white-and-black circles, and with the backbone routers depicted as white-and-black boxes.

The convertible wireless devices depicted as white-and-black circles are capable of wireless communication with the wireless devices depicted as white circles, with the wireless devices depicted as black circles, with the other convertible wireless devices depicted as white-and-black circles, and with the backbone routers depicted as white-and-black boxes. This arrangement of the convertible wireless devices 13a to 13c and the backbone routers 20a and 20b capable of wireless communication compliant with a plurality of wireless standards forms the wireless networks N1 and N2, on which there is a mixture of the wireless devices 11a to 11e and the wireless device 12a and 12e performing wireless communications compliant with mutually different wireless standards.

The coordinator 30 corresponds to the management apparatus M in FIG. 1, and manages the wireless networks N1 and N2. Specifically, the coordinator 30 ascertains all wireless communications performed via the wireless networks N1 and N2, allocates links to the wireless devices forming the wireless networks N1 and N2, and thereby manages the communication paths, communication timings, communication peers and the like of wireless communications performed via the wireless networks N1 and N2. A link defines the channel and timeslot used in TDMA wireless communication, and also specifies the communication direction (see link NL in FIG. 1).

The coordinator 30 manages extended links, in each of which a communication property, which is property information characterizing wireless communications performed via the wireless networks N1 and N2, has been set on the link described above (see extended link EL in FIG. 1). In addition to the communication direction specified in the link NL, a communication property can also contain at least one of: information indicating a communication protocol, a frequency channel, an antenna, a modulation, a cryptographic algorithm, and a cryptographic key, which are used in the wireless communication, information indicating the bandwidth of the wireless communication, and information indicating a subnet to be connected to the wireless network (see communication property CP in FIG. 1).

As shown in FIG. 2, the first preferred embodiment enables multi-hop connection, in addition to single-hop connection. Single-hop connection is a connective state where a wireless device or a convertible wireless device is connected directly to a backbone router. Multi-hop connection is a connective state where a wireless device or convertible wireless device is connected via another wireless device or convertible wireless device to a wireless relay device. The coordinator 30 manages the communication properties such as to achieve a match between communication properties of wireless devices and convertible wireless devices that are adjacent to each other on the communication paths of the wireless networks N1 and N2.

The time server 40 synchronizes the times of the backbone routers 20a and 20b, the coordinator 30, and the gateway device 50, which are connected to the backbone network N3. The gateway device 50 connects the backbone network N3 to other networks (not shown). The gateway device 50 is also managed by the coordinator 30, which manages communication resources such as the communication paths between the wireless devices, the backbone routers, and such like forming the wireless networks N1 and N2.

(Configurations of Wireless Device and Convertible Wireless Device)

Figure 3A:
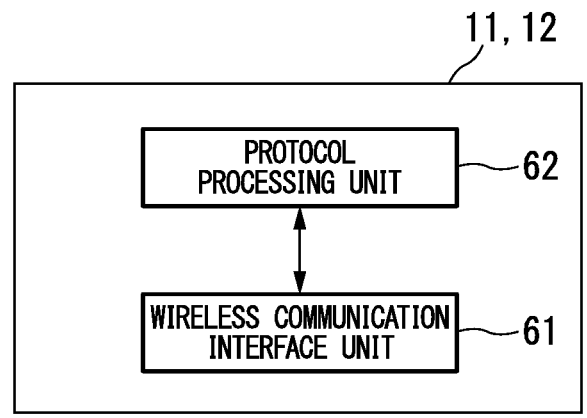
FIG. 3A is a block diagram illustrating the main constitutive parts of wireless devices in accordance with the first preferred embodiment of the present invention.
Figure 3B:
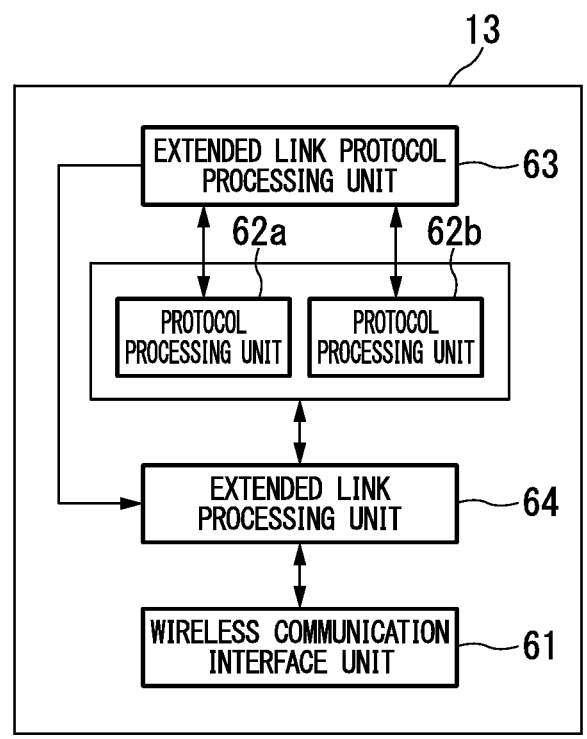
FIG. 3B is a block diagram illustrating the main constitutive parts of wireless devices in accordance with the first preferred embodiment of the present invention.

FIGS. 3A and 3B are block diagrams illustrating the main constitutive parts of wireless devices in accordance with the first preferred embodiment of the present invention. FIG. 3A is a block diagram of wireless devices 11 and 12, and FIG. 3B is a block diagram of a convertible wireless device 13. Hereinafter, when there is no need to differentiate between each of the wireless devices 11a to 11e, the wireless devices 12a to 12e, and the convertible wireless devices 13a to 13c, they will be referred to as wireless device 11, wireless device 12, and convertible wireless device 13.

As shown in FIG. 3A, the wireless devices 11 and 12 include a wireless communication interface unit 61 and a protocol processing unit 62. The wireless communication interface unit 61 transmits signals processed in the protocol processing unit 62 as wireless signals; in addition, it receives wireless signals transmitted from the outside and outputs the received signals to the protocol processing unit 62. The protocol processing unit 62 performs a protocol process according to a predetermined wireless communication standard. Specifically, the protocol processing unit 62 provided in the wireless device 11 performs a protocol process according to ISA100.11a, and the protocol processing unit 62 provided in the wireless device 12 performs a protocol process according to WirelessHART (Registered Trademark).

As shown in FIG. 3B, the convertible wireless device 13 includes a wireless communication interface unit 61, protocol processing units 62a and 62b, an extended link protocol processing unit 63, and an extended link processing unit 64. The wireless communication interface unit 61 and the protocol processing units 62a and 62b are respectively similar to the wireless communication interface unit 61 and the protocol processing unit 62 provided in the wireless devices 11 and 12. However, the protocol processing units 62a and 62b perform protocol processes according to mutually different communication protocols.

For example, the protocol processing unit 62a performs a protocol process according to ISA100.11a, and the protocol processing unit 62b performs a protocol process according to WirelessHART (Registered Trademark). While FIGS. 3A and 3B show two protocol processing units 62a and 62b, the number of protocol processing units is the same as the number of communication protocols that the convertible wireless device 13 can use.

The extended link protocol processing unit 63 transmits and receives communication properties. Specifically, the extended link protocol processing unit 63 receives communication properties contained in extended links EL from the protocol processing units 62a and 62b, and sets properties according to the received communication properties. Also, the extended link protocol processing unit 63 outputs extended links received from the protocol processing units 62a and 62b to the extended link processing unit 64. The extended link processing unit 64 performs processes according to the links obtained by processes of the protocol processing units 62a and 62b, and according to the communication properties obtained from the extended link protocol processing unit 63. For example, it performs processes such as switching the communication protocols or antennas used in wireless communication.

(Configuration of Coordinator)

Figure 4:
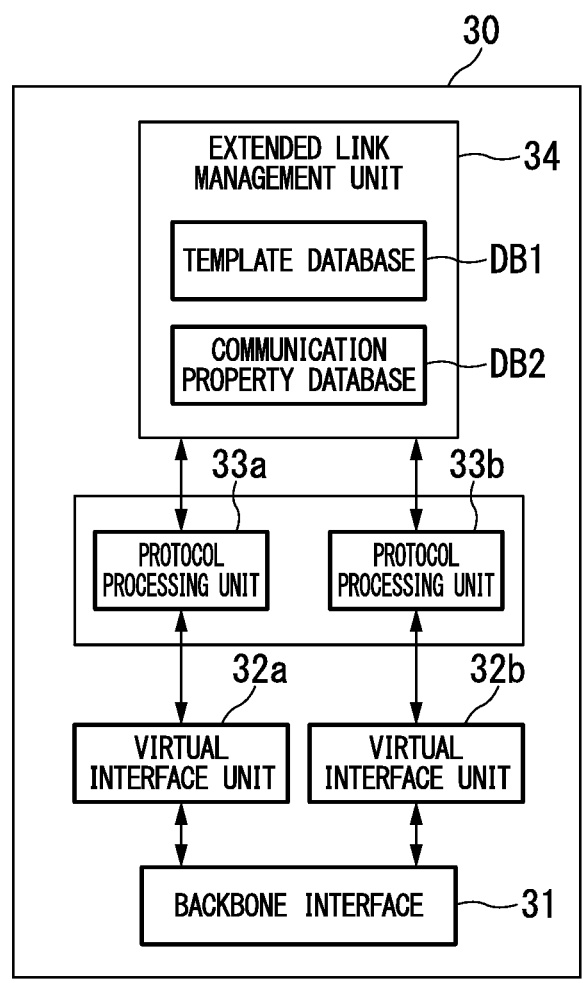
FIG. 4 is a block diagram illustrating the main constitutive part of a coordinator in the first preferred embodiment of the present invention.

FIG. 4 is a block diagram illustrating the main constitutive part of a coordinator in the first preferred embodiment of the present invention. As shown in FIG. 4, the coordinator 30 includes a backbone interface 31, virtual interface units 32a and 32b, protocol processing units 33a and 33b, and an extended link management unit 34. The backbone interface 31 transmits signals from the virtual interface units 32a and 32b to the backbone network N3; in addition, it receives signals transmitted from the backbone network N3 and outputs these received signals to the virtual interface units 32a and 32b.

The virtual interface units 32a and 32b identify communication protocols, and are provided between the backbone interface 31 and the protocol processing units 33a and 33b. The protocol processing units 33a and 33b perform protocol processes according to predetermined wireless communication standards. Specifically, the protocol processing unit 33a performs a protocol process according to ISA100.11a, and the protocol processing unit 33b performs a protocol process according to WirelessHART (Registered Trademark). While FIG. 4 shows two protocol processing units 33a and 33b, the number of protocol processing units is the same as the number of communication protocols that the coordinator 30 can use.

The extended link management unit 34 includes a template database DB1 (first database) and a communication property database DB2 (second database), and refers to these databases while managing the extended links. In addition, the extended link management unit 34 sets communication properties for the wireless devices, backbone routers, and such like forming the wireless networks N1 and N2. The template database DB1 stores information (templates) needed when setting communication properties for the wireless devices, backbone routers, and such like forming the wireless networks N1 and N2. In contrast, the communication property database DB2 stores communication properties that are presently set for the wireless devices, backbone routers, and such like forming the wireless networks N1 and N2.

FIGS. 5A and 5B are examples of databases used in accordance with the first preferred embodiment of the present invention. FIG. 5A is an example of the template database DB1, and FIG. 5B is an example of communication property database DB2. As shown in FIG. 5A, the template database DB1 stores templates including, for example, the following information.
  Device type ID
  Support protocols
  Occupy timeslot
  Protocol switching margin
  Number of subnets
  Wireless I/F
  Number of wireless I/F
  Default property As shown in FIG. 5B, the communication property database DB2 stores communication properties including, for example, the following information for each of the wireless devices and backbone routers forming the wireless networks N1 and N2.
  Owner device ID
  Peer device ID
  Direction
  Protocol
  Timeslot start
  Cycle
  Duration
  Channel
  Property group The pieces of information shown in FIGS. 5A and 5B are merely examples, and other information can be used. For example, when the wireless device includes a plurality of antennas, information for specifying an antenna for use in wireless communication can be used. The group ID of the communication properties is used for correlating a plurality of communication properties. For example, it is used when two communication properties are correlated in bidirectional communication, or when communication properties are allocated along a communication path, etc. By handling a plurality of communication properties as a single group using this group ID, the communication properties can be managed easily.

(Operation when Setting Communication Property)

Subsequently, an operation performed when a communication property is set in the communication system having this configuration will be explained. To facilitate understanding, the example described below is one where the convertible wireless device 13a makes a request for resource allocation to the coordinator 30 in order to newly start wireless communication compliant with WirelessHART (Registered Trademark), and the coordinator 30 allocates communication properties to the convertible wireless device 13a. It is assumed that, in an initial state, the convertible wireless device 13a can perform wireless communication compliant with ISA100.11a with the wireless device 11d and the backbone router 20a.

FIG. 6 is a flowchart illustrating an operation performed when setting a communication property in accordance with the first preferred embodiment of the present invention. Of steps S0 to S2 in FIG. 6, step S0 and S2 are processes performed by the convertible wireless device 13a when setting a communication property, and step S1 is a process performed by the coordinator 30 when setting the same communication property.

Firstly, a request for allocation of resources needed to perform new wireless communication compliant with WirelessHART (Registered Trademark) is transmitted from the convertible wireless device 13a to the coordinator 30 (step S0). The process of transmitting this allocation request is performed by the protocol processing unit 62a, which performs a protocol process according to ISA100.11a (see FIG. 3B). The communication resource allocation request transmitted from the convertible wireless device 13a passes through the wireless communication network N1, the backbone router 20a, and the backbone network N3 in that order, and is received by the backbone interface 31 of the coordinator 30 (step S11).

The communication resource allocation request received by the backbone interface 31 is output to the virtual interface units 32a and 32b, the communication protocol used in transmitting communication resource allocation request is identified, and the protocol processing units 33a and 33b perform protocol processes according to the identification result (step S12). The virtual interface unit 32a identifies the communication protocol used in transmitting the communication resource allocation request as ISA100.11a, and the protocol processing unit 33a performs a protocol process according to ISA100.11a. When this protocol process creates a need for a new link to be allocated, the protocol processing unit 33a outputs a link allocation request to the extended link management unit 34.

When a link allocation request is input, the extended link management unit 34 searches the template database DB1 and performs a process of acquiring information relating to the communication protocol to be used in a new wireless communication (step S13). Specifically, the extended link management unit 34 uses the device type ID of the convertible wireless device 13a that made the communication resource allocation request, and information indicating the communication protocol to be used in a new wireless communication, as keys in searching the template database DB1, and acquires information such as the occupy timeslot needed for the wireless communication and the communication protocol switching margin (see FIG. 5A).

When it acquires the information relating to the communication protocol, the extended link management unit 34 searches the communication property database DB2 and performs a process of acquiring the links and communication properties that have been set in the convertible wireless device 13a (step S14). Specifically, the extended link management unit 34 uses the owner device ID of the convertible wireless device 13a that made the communication allocation resource request as a key in searching the communication property database DB2, and thus acquires the links and communication properties.

The extended link management unit 34 acquires the owner device IDs of the communication peers of the convertible wireless device 13a (the wireless device 11d, the convertible wireless device 13b, and the backbone router 20a) from the communication properties acquired in the process of step S14. The extended link management unit 34 then uses these owner device IDs as keys in searching the communication property database DB2, and performs a process of acquiring the links and communication properties that have been set in the communication peers of the convertible wireless device 13a (step S15). This process is performed to allocate new links and communication properties, without affecting existing communications.

Figure 7:
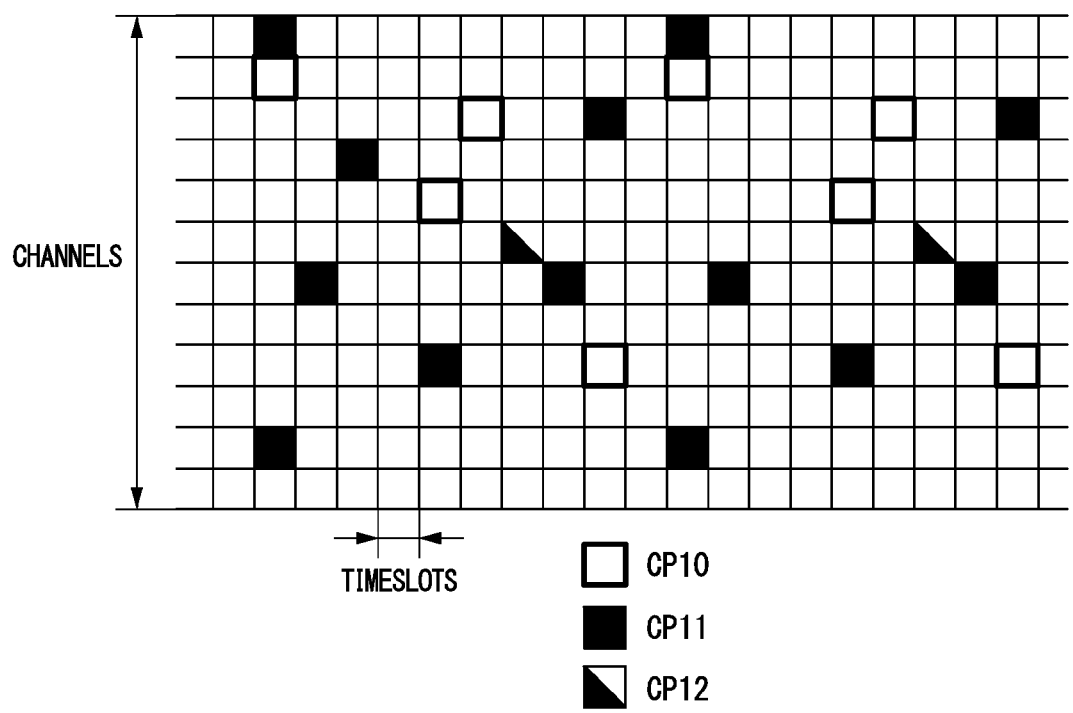
FIG. 7 is one example of a communication resource map created in the first preferred embodiment of the present invention.

When the above processes end, the extended link management unit 34 creates a communication resource map indicating the allocation state of channels, timeslots, and communication properties shown in FIG. 7, from the links and communication properties it acquired in steps S14 and S15. FIG. 7 is one example of a communication resource map created in the first preferred embodiment of the present invention. Communication properties CP10 in FIG. 7 were acquired in step S14, and communication properties CP11 were acquired in step S15.

The extended link management unit 34 considers the information relating to the communication protocol acquired in step S13 and determines the links that can be allocated, and then creates an extended link with the new communication properties set on it (step S16). Specifically, the extended link management unit 34 considers the information indicating the occupy timeslot needed for the wireless communication and the protocol switching margin and such like, acquired in step S13, and determines the channels and timeslots that can be allocated. It then allocates communication properties (the communication properties CP12 in FIG. 7) for enabling wireless communication compliant with WirelessHART (Registered Trademark).

When this process ends, the extended link created by the extended link management unit 34 is output to the protocol processing unit 33a, and is transmitted to the backbone network N3 by a process performed by the protocol processing unit 33a (step S17). The extended link allocation message transmitted to the backbone network N3 passes through the backbone router 20a and the wireless communication network N1 in that order, and is received at the wireless communication interface unit 61 of the convertible wireless device 13a (step S21).

The extended link allocation message received at the wireless communication interface unit 61 is output to the protocol processing unit 62a, and the link contained in the extended link is processed (step S22). In contrast, it is not always possible to process all the communication properties contained in the extended link (the communication properties CP12 in FIG. 7) in the protocol processing unit 62a, and they are therefore output from the protocol processing unit 62a to the extended link protocol processing unit 63, where they are processed. Specifically, the extended link protocol processing unit 63 performs a process of setting properties defined by communication properties contained in the extended link (step S23).

The communication properties contained in the extended link are transmitted from the extended link protocol processing unit 63 to the extended link processing unit 64. The extended link processing unit 64 is now able to switch the communication protocol in each timeslot, based on the link processed in step S22 and the communication properties obtained after the process of step S23 (step S24).

By the processes described above, the convertible wireless device 13a becomes capable of new wireless communication compliant with WirelessHART (Registered Trademark), in addition to wireless communication compliant with ISA100.11a. However, for the convertible wireless device 13a to actually perform wireless communication, setting must also be performed for its communication peers (e.g. the wireless device 11d and the convertible wireless device 13b). Accordingly, the coordinator 30 performs processes similar to those from step S13 onward in FIG. 6, and performs settings for the communication peers of the convertible wireless device 13a.

Specifically, in regard to the convertible wireless device 13b, which is a communication peer of the convertible wireless device 13a, the following process is performed. As in step S13 of FIG. 6, the extended link management unit 34 of the coordinator 30 searches the template database DB1 and performs a process of acquiring information relating to a communication protocol for the convertible wireless device 13b. As in step S14 of FIG. 6, the extended link management unit 34 then searches the communication property database DB2, and performs a process of acquiring links and communication properties that have been set in the convertible wireless device 13b.

As in step S15 of FIG. 6, the extended link management unit 34 acquires the device IDs of the communication peers of the convertible wireless device 13b (the wireless device 12a and the convertible wireless device 13a). It then searches the communication property database DB2 again, and performs a process of acquiring the links and communication properties that have been set in the communication peers of the convertible wireless device 13b.

When this process ends, as in step S16 of FIG. 6, the extended link management unit 34 creates a communication resource map similar to the one shown in FIG. 7, determines the links that can be allocated after considering the information relating to the communication protocol for the convertible wireless device 13b, and creates an extended link with new communication properties set on it. The extended link created by the process described above is transmitted to the convertible wireless device 13b, and, as in steps S17 to S24 in FIG. 6, a process of setting the extended link in the convertible wireless device 13b is performed.

Thereafter, when the convertible wireless device 13a is capable of wireless communication compliant with both ISA100.11a and WirelessHART (Registered Trademark) and makes a communication resource allocation request to the coordinator 30, an ISA100.11a communication resource allocation request can be performed in the protocol processing unit 62a that performs a protocol process according to ISA100.11a (see FIG. 3B), and a WirelessHART (Registered Trademark) communication resource allocation request can be performed in the protocol processing unit 62b that performs a protocol process according to WirelessHART (Registered Trademark) (see FIG. 3B).

When the communication peer of the convertible wireless device 13a is the wireless device 11d, the process performed is basically the same as that performed in regard to the convertible wireless device 13b. However, in step S13 of FIG. 6, when the extended link management unit 34 searches the template database DB1 and acquires the information relating to the communication protocol for the wireless device 11d, it identifies the wireless device 11d as a normal wireless device capable of using only one protocol. Accordingly, in step S16 of FIG. 6, the extended link management unit 34 considers the fact that the wireless device 11d is a normal wireless device in allocating the link. Since the wireless device 11d is a normal wireless device, step S23 in FIG. 6 is omitted.

(Procedure for Joining Wireless Network)

As shown in FIG. 2, in the communication system 1 of the first preferred embodiment, the wireless networks N1 and N2 are formed by a mixture of wireless devices 11a to 11e that use a communication protocol compliant with ISA100.11a ('communication protocol A'), and wireless devices 12a to 12e that use a communication protocol compliant with WirelessHART (Registered Trademark) ('communication protocol C'). The first preferred embodiment includes an advertisement router capable of supplying both advertisements for the wireless devices 11a to 11e and advertisements for the wireless devices 12a to 12e, making it possible to connect any of the wireless devices 11a to 11e and the wireless devices 12a to 12e to the wireless networks N1 and N2.

Figure 8:
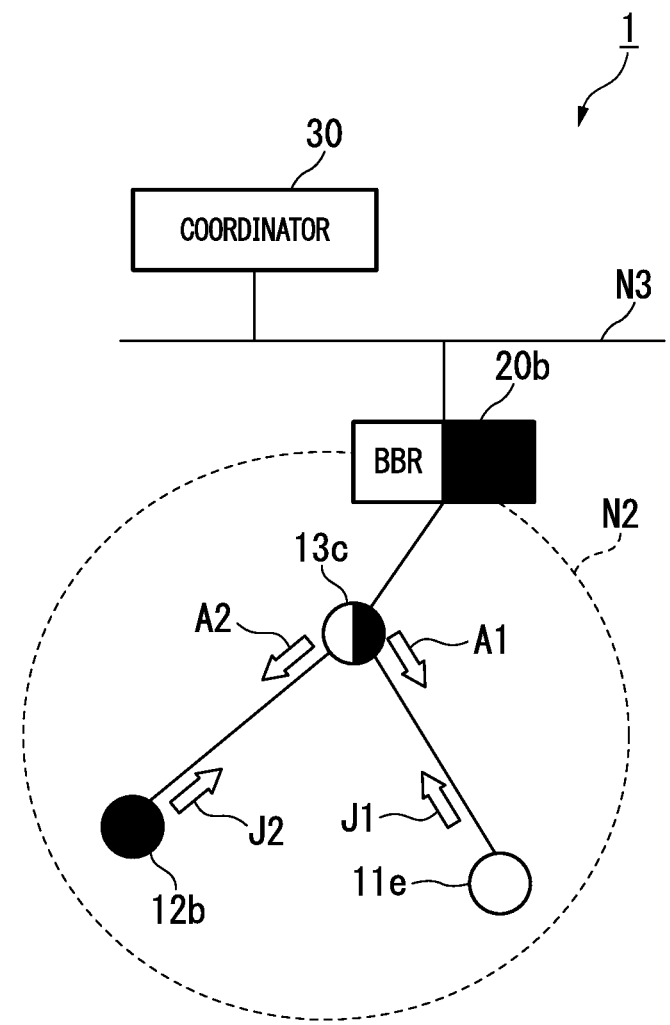
FIG. 8 is an explanatory diagram illustrating a procedure for joining a wireless network in accordance with the first preferred embodiment of the present invention.

FIG. 8 is an explanatory diagram illustrating a procedure for joining a wireless network in accordance with the first preferred embodiment of the present invention. To facilitate understanding, the wireless network N1, the time server 40, and the gateway device 50 of FIG. 2 are not shown in FIG. 8. Also, of the wireless devices constituting the wireless network N2, only the wireless device 11e, the wireless device 12b, and the convertible wireless device 13c are shown in FIG. 8.

Let us suppose that the wireless device 11e and the wireless device 12b are attempting to connect to (join) the wireless network N2, and that the convertible wireless device 13c functions as an advertisement router that supplies information for connecting the wireless devices 11e and 12b to the wireless network N2 as an advertisement. Since the wireless device 11e is using 'communication protocol A' and the wireless device 12b is using 'communication protocol C', in accordance with extended link set by the coordinator 30, the convertible wireless device 13c supplies an advertisement A1 for 'communication protocol A' and an advertisement A2 for 'communication protocol C'.

Figure 9:
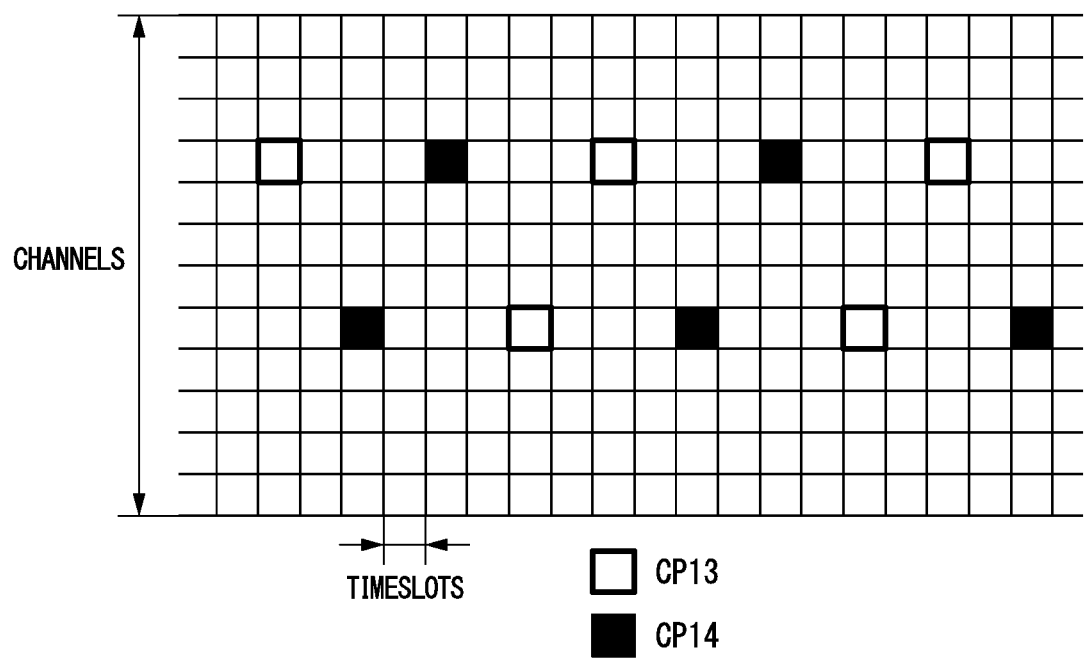
FIG. 9 is an explanatory diagram illustrating extended links for advertisements in accordance with the first preferred embodiment of the present invention.

FIG. 9 is an explanatory diagram illustrating extended links for advertisements in accordance with the first preferred embodiment of the present invention. The communication properties CP13 in FIG. 9 are extended properties set in an extended link regarding the advertisement A1, and contain information indicating 'communication protocol A'. The communication properties CP14 in FIG. 9 are extended properties set in an extended link regarding the advertisement A2, and contain information indicating 'communication protocol C'. In the example of FIG. 9, the advertisements A1 and A2 are supplied alternately using different channels.

Since the wireless device 11e can only use 'communication protocol A', it is unable to receive the advertisement A2 for 'communication protocol C' supplied from the convertible wireless device 13c, and only receives the advertisement A1 for 'communication protocol A'. In contrast, since the wireless device 12b can only use 'communication protocol C', it is unable to receive the advertisement A1 for 'communication protocol A' supplied from the convertible wireless device 13c, and only receives the advertisement A2 for 'communication protocol C'.

The advertisements A1 and A2 supplied from the convertible wireless device 13c contain information specifying links used for respectively transmitting join requests J1 and J2 from the wireless device 11e and the wireless device 12b. The wireless device 11e and the wireless device 12b that received the advertisements A1 and A2 therefore transmit the join requests J1 and J2 to the convertible wireless device 13c using the links specified in the information respectively contained in the advertisements A1 and A2. The links used for transmitting the join requests J1 and J2 are set by the coordinator 30, separately from the extended links used for supplying the advertisements A1 and A2.

By limiting the advertisements A1 and A2 supplied from the convertible wireless device 13c, it is possible to limit the wireless devices that join the wireless network N2. For example, if only the advertisement A1 for 'communication protocol A' is supplied from the convertible wireless device 13c, only wireless devices that can use 'communication protocol A' will be able to join, and if only the advertisement A2 for 'communication protocol C' is supplied, only wireless devices that can use 'communication protocol C' will be able to join.

As described above, in the first preferred embodiment, the coordinator 30 manages extended links containing information indicating a communication protocol added to a conventional link used in TDMA wireless communication. In addition, information indicating the communication protocols contained in the extended links is set in the convertible wireless devices 13a to 13c, which can use a plurality of communication protocols. Therefore, if the communication protocols are managed so that they match with the communication peers, even when there is a mixture of wireless devices using different communication protocols on the wireless networks N1 and N2, wireless communication will be possible via those wireless networks N1 and N2.

(Second Preferred Embodiment)

Figure 10:
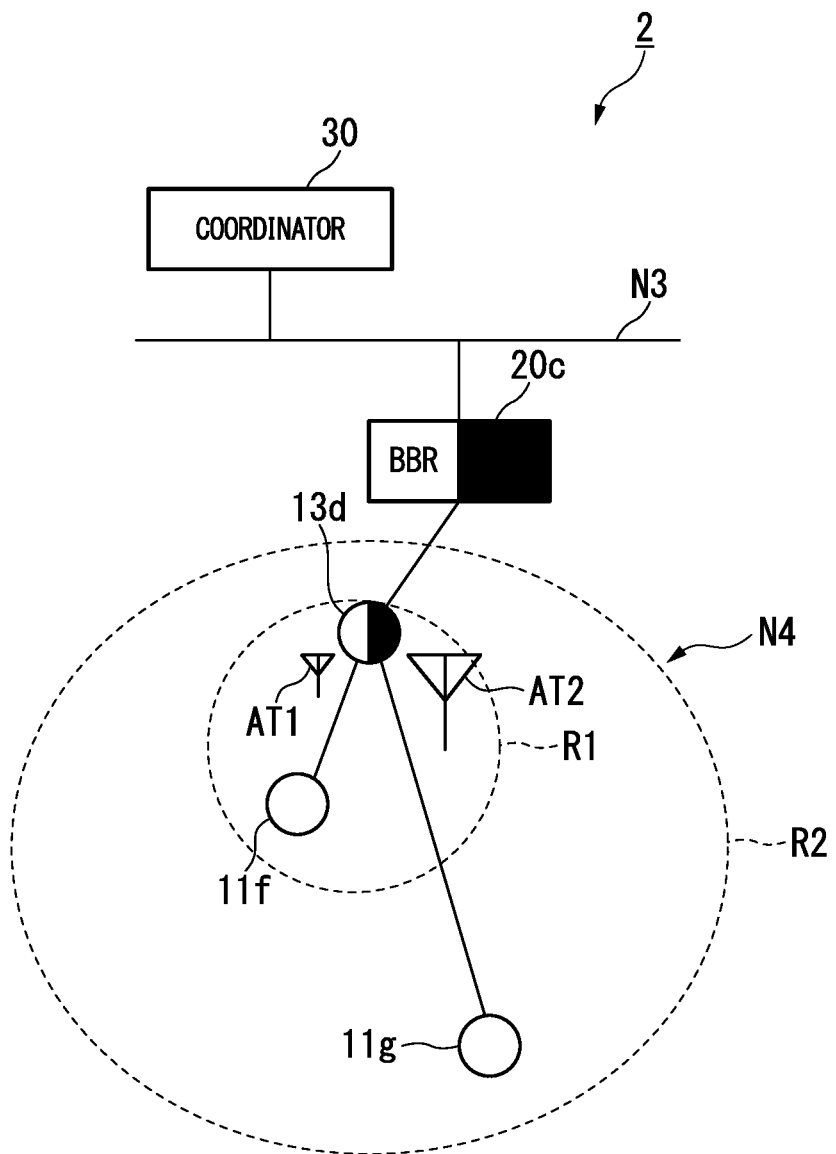
FIG. 10 is a diagram illustrating the main constitutive part of a communication system in accordance with a second preferred embodiment of the present invention.

FIG. 10 is a diagram illustrating the main constitutive part of a communication system in accordance with a second preferred embodiment of the present invention. As shown in FIG. 10, a communication system 2 of the second preferred embodiment includes wireless devices 11f and 11g, a convertible wireless device 13d, a backbone router 20c, and a coordinator 30, and can switch between antennas AT1 and AT2 of the convertible wireless device 13d using extended links. In the second preferred embodiment, the template database DB1 and the communication property database DB2 used by the coordinator 30 contain information specifying the antennas AT1 and AT2, and the antennas AT1 and AT2 can be switched using this information.

The wireless devices 11f and 11g, the convertible wireless device 13d, and the backbone router 20c are respectively similar to the wireless devices 11a to 11e, the convertible wireless devices 13a to 13c, and the backbone routers 20a and 20b shown in FIG. 2. However, the convertible wireless device 13d differs from the convertible wireless devices 13a to 13c in that it includes two switchable antennas AT1 and AT2 with different gains. In FIG. 10, wave propagation range R1 is the range of waves transmitted from the antenna AT1, and wave propagation range R2 is the range of waves transmitted from the antenna AT2. The antenna AT1 has a lower gain than the antenna AT2, and the wave propagation range R1 is narrower than the wave propagation range R2.

The coordinator 30 is similar to the coordinator 30 shown in FIG. 2. However, while the coordinator 30 of FIG. 2 managed the extended links with communication properties containing communication protocols, the coordinator 30 of FIG. 10 differs in that it manages extended links with communication properties containing information specifying one of the antennas AT1 and AT2.

By managing such extended links with information specifying the antennas AT1 and AT2 added thereto, it is possible to switch the antennas AT1 and AT2. For example, the convertible wireless device 13d uses the low-gain antenna AT1 to perform wireless communication with the wireless device 11f, which is installed adjacent to it, and uses the high-gain antenna AT2 to perform wireless communication with the wireless device 11g, which is installed at a distant position.

The wireless device 11f is installed within the wave propagation range R1, and is also within the wave propagation range R2. Consequently, when the convertible wireless device 13d is functioning as an advertisement router, the wireless device 11f receives advertisements transmitted from both the antenna AT1 and the antenna AT2. Conceivably, as a result of the advertisement transmitted the antenna AT2, the wireless device 11f may request to join the wireless communication network N4. In that case, after the wireless device 11f has been allowed to join the wireless communication network N4, the antenna is switched so that wireless communication can be performed with the wireless device 11f using the antenna AT1, and the links and the communication properties are reset.

(Third Preferred Embodiment)

Figure 11:
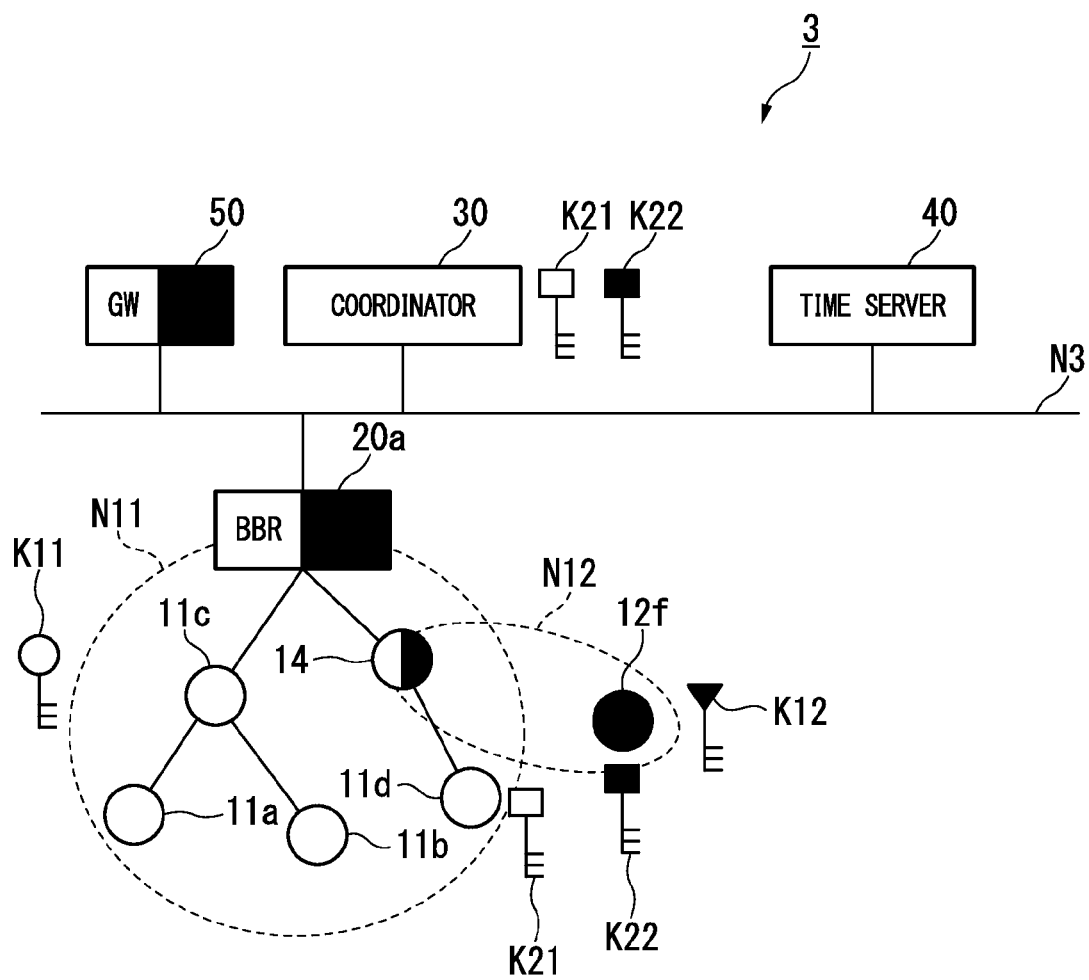
FIG. 11 is a diagram illustrating the main constitutive part of a communication system in accordance with a third preferred embodiment of the present invention.

FIG. 11 is a diagram illustrating the main constitutive part of a communication system in accordance with a third preferred embodiment of the present invention. As shown in FIG. 11, a communication system 3 of the third preferred embodiment includes wireless devices 11a to 11d, a wireless device 12f, a convertible wireless device 14, a backbone router 20a, a coordinator 30, a time server 40, and a gateway 50, and enables a plurality of wireless subnets N11 and N12 to be connected using extended links.

The wireless subnet N11 is an original wireless network formed by the wireless devices 11a to 11d, the convertible wireless device 14, and the backbone router 20a. The wireless subnet N12 is a provisional wireless network formed by the convertible wireless device 14 and the wireless device 12f, for performing over-the-air (OTA) provisioning of the wireless device 12f. Provisioning is a process of pre-setting information needed when the wireless device 12f joins the wireless subnet N11, and the OTA provisioning mentioned above is a method of performing provisioning via the wireless subnet N11 that the wireless device 12f is attempting to join.

The purpose of separating the wireless subnet N11, which is the original network, and the provisional wireless subnet N12 for OTA provisioning is to maintain security. In the OTA provisioning stage, the wireless device 12f has not been authenticated, and a cryptographic key K11 used on the wireless subnet N11 cannot be appended to the wireless device 12f. Therefore, security is maintained by providing the wireless subnet N12 separately from the wireless subnet N11, and appending a cryptographic key K12 that is different from the cryptographic key K11. The cryptographic key K21 shown in FIG. 11 is used in communicating with the coordinator 30 and the wireless device 11d, and the cryptographic key K22 is used in communicating with the coordinator 30 and the wireless device 12f.

Figure 12:
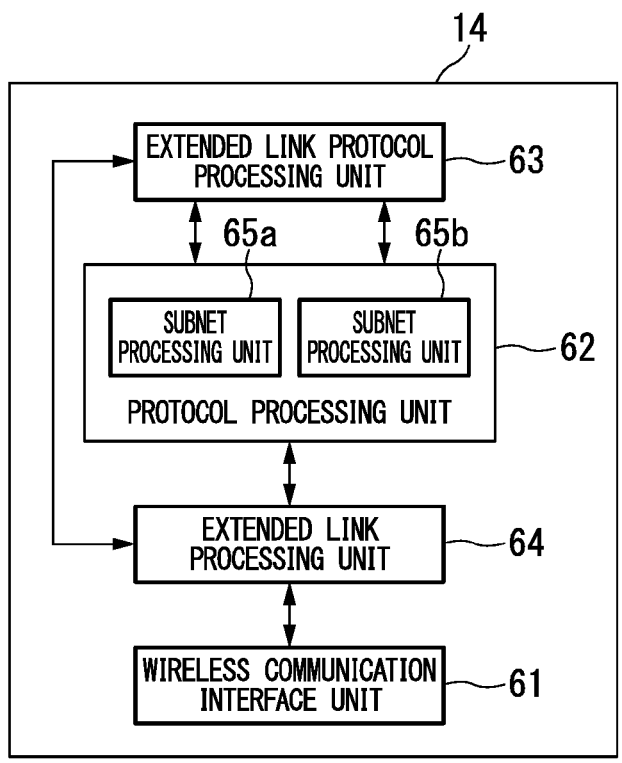
FIG. 12 is block diagram illustrating the main constitutive part of a convertible wireless device in accordance with a third preferred embodiment of the present invention.

The convertible wireless device 14 can perform wireless communication via the wireless subnet N11 and via the wireless subnet N12. In addition to connecting the wireless subnets N11 and N12, the convertible wireless device 14 functions as a provisioning-type router that performs OTA provisioning of the wireless device 12f. FIG. 12 is block diagram illustrating the main constitutive part of a convertible wireless device in accordance with a third preferred embodiment of the present invention.

The convertible wireless device 13 shown in FIG. 3B is configured by extending the protocol processing unit 62 of the wireless devices 11 and 12 shown in FIG. 3A and adding the protocol processing units 62a and 62b. In contrast, as shown in FIG. 12, the convertible wireless device 14 is configured by adding subnet processing units 65a and 65b. The subnet processing unit 65a performs a process needed for performing wireless communication via the wireless subnet N11, and the subnet processing unit 65b performs a process needed for performing wireless communication via the wireless subnet N12.

The coordinator 30 manages extended links with communication properties containing subnet IDs (IDs allocated arbitrarily to each of the wireless subnets N11 and N12). By managing such extended links with subnet IDs added to them, it becomes possible to switch between wireless communication via the wireless subnet N11 and wireless communication via the wireless subnet N12, and thereby connect the wireless subnets N11 and N12.

Figure 13:
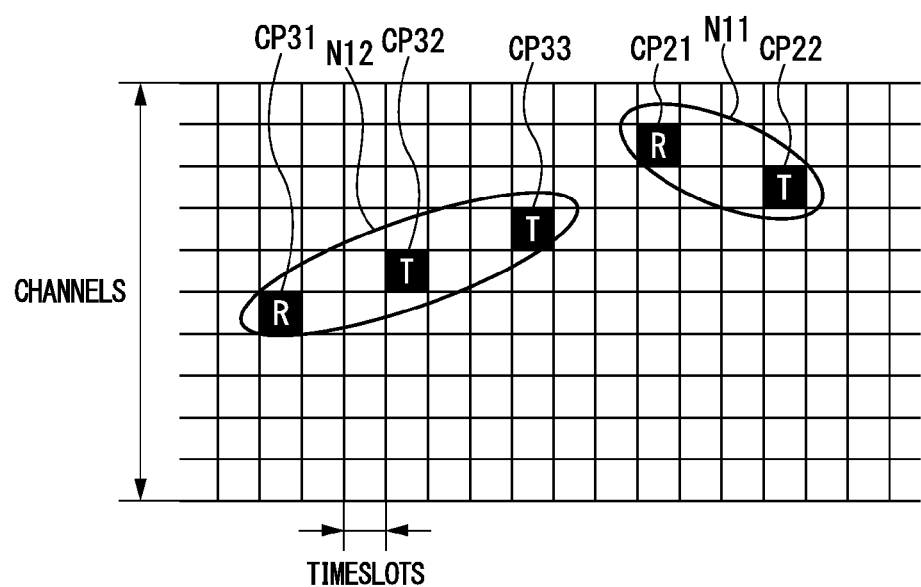
FIG. 13 is an explanatory diagram illustrating extended links for wireless subnet connection in accordance with the third preferred embodiment of the present invention.

The coordinator 30 must allocate the extended links such that the channels and timeslots of the wireless subnets N11 and N12 do not collide (overlap). Specifically, the coordinator 30 stores the information allocated to the wireless subnets N11 and N12 in the communication property database DB2, and, as shown in FIG. 13, manages the links of the convertible wireless device 14 as communication properties CP21, CP22, and CP31 to CP33. FIG. 13 is an explanatory diagram illustrating extended links for wireless subnet connection in accordance with the third preferred embodiment of the present invention. By managing them in this manner, it is possible to prevent collisions (overlaps) in the allocation of channels and timeslots on the wireless subnets N11 and N12.

(Fourth Preferred Embodiment)

FIG. 14 is one example illustrating a communication property database used in accordance with a fourth preferred embodiment of the present invention. As shown in FIG. 14, the communication property database DB2 used in the fourth preferred embodiment includes the communication property database DB2 of FIG. 5B, with information indicating media access control (MAC) layers added thereto. The information indicating the MAC layers is added not only to the property database DB2 but also to the template database DB1.

In the fourth preferred embodiment, the template database DB1 and the communication property database DB2 with the information indicating the MAC layers added to them are managed by the coordinator 30, whereby it is possible to switch the MAC layer used by the convertible wireless device. For example, if a MAC layer compliant with IEEE802.15.4 and a MAC layer compliant with IEEE802.15.4e are provided in the convertible wireless device, and information indicating one of them ('15.4' and '15.4e' in FIG. 14) is stored in the template database DB1 and the communication property database DB2 managed by the coordinator 30, the MAC layer can be switched.

(Fifth Preferred Embodiment)

FIG. 15 is a diagram illustrating one example of a communication property database used in a fifth preferred embodiment of the present invention. As shown in FIG. 15, the communication property database DB2 used in the fifth preferred embodiment includes the communication property database DB2 shown in FIG. 5B with information indicating frequency bands (Freq) added thereto. As in the fourth preferred embodiment, the information indicating frequency bands is added not only to the communication property database DB2 but also to the template database DB1.

In the fifth preferred embodiment, the template database DB1 and the communication property database DB2 with the information indicating frequency bands added to them are managed by the coordinator 30, enabling the frequency bands used by the convertible wireless device to be used selectively. For example, the convertible wireless device is provided with two of the wireless communication interface units 61 (physical layer) shown in FIG. 3B, one using a frequency band near 2.4 GHz (Industry-Science-Medical (ISM) band) and the other using a frequency band near 1 GHz (Sub 1 GHz). If information indicating one of them ('2.4 GHz' and '915 MHz' in FIG. 15) is stored in the template database DB1 and the communication property database DB2 managed by the coordinator 30, the frequency bands can be used selectively.

(Sixth Preferred Embodiment)

Figure 16:
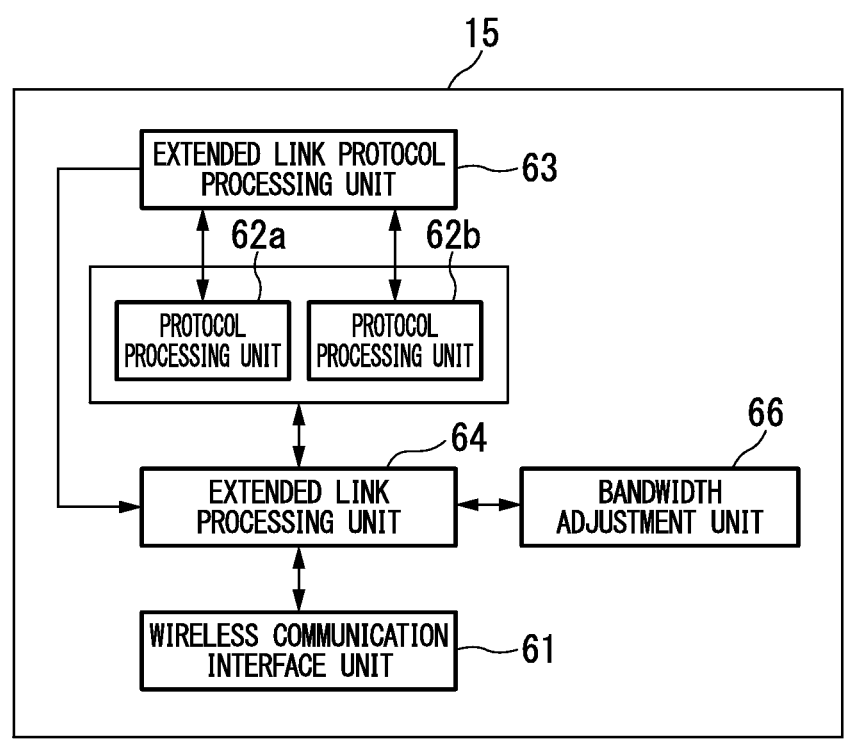
FIG. 16 is a block diagram of the main constitutive part of a convertible wireless device in accordance with a sixth preferred embodiment of the present invention.

FIG. 16 is a block diagram of the main constitutive part of a convertible wireless device in accordance with a sixth preferred embodiment of the present invention. As shown in FIG. 16, a convertible wireless device 15 in the sixth preferred embodiment is configured by adding a bandwidth adjustment unit 66 to the convertible wireless device 13 of FIG. 3B, and the bandwidth can be adjusted under the management of the coordinator 30. Information indicating the bandwidth of the convertible wireless device 15 is stored in the template database DB1 and the communication property database DB2, and, based on this information stored in the databases, the coordinator 30 adjusts the bandwidth of the convertible wireless device 15.

The bandwidth adjustment unit 66 monitors the communication quality of wireless communications performed via the wireless communication interface unit 61, and outputs a monitoring result to the extended link processing unit 64. For example, it monitors whether the bandwidth has become insufficient based on the incidence and quantity of transmitted data, and, when the bandwidth is insufficient, it outputs information indicating this insufficiency to the extended link processing unit 64. In accordance with the monitoring result of the bandwidth adjustment unit 66, the extended link processing unit 64 makes a request for a change of the existing communication resources to the coordinator 30.

Figure 17A:
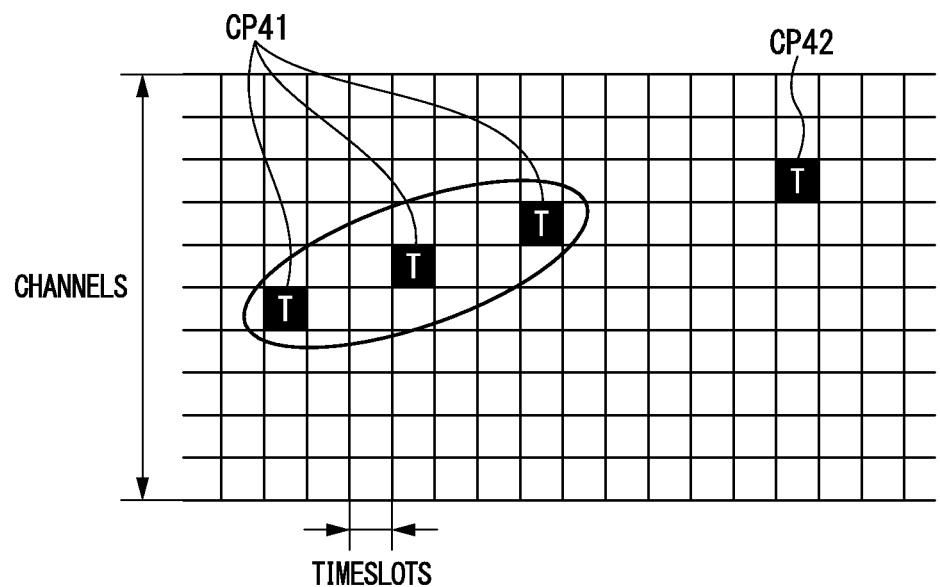
FIG. 17A is an explanatory diagram of extended links allocated in accordance with the sixth preferred embodiment of the present invention.
Figure 17B:
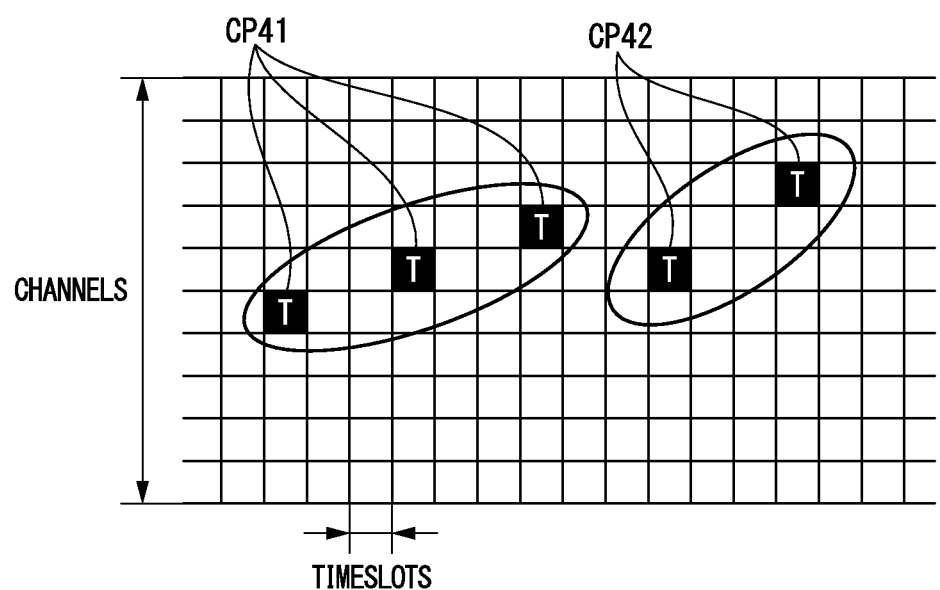
FIG. 17B is an explanatory diagram of extended links allocated in accordance with the sixth preferred embodiment of the present invention.

FIGS. 17A and 17B are explanatory diagrams of extended links allocated in accordance with the sixth preferred embodiment of the present invention. FIG. 17A shows an allocation of extended links in an initial state, and FIG. 17B shows an allocation of extended links after the allocation has been changed. Let us suppose that, in the initial state, there are three extended links with the same communication property CP41 allocated to them, and one extended link with communication property CP42 allocated to it. A convertible wireless device that performs a communication using an extended link with communication property CP41 allocated to it has three times the bandwidth of a convertible wireless device that performs a communication using the extended link with communication property 42 allocated to it.

Let us now consider a case where the convertible wireless device 15 performs a communication using the extended link with communication property CP42 allocated to it, shown in FIG. 17A. While this communication is being performed, the bandwidth adjustment unit 66 provided in the convertible wireless device 15 constantly monitors the communication quality. For example, based on the incidence and quantity of transmitted data, it monitors whether the bandwidth has become insufficient. When the bandwidth has become insufficient, the bandwidth adjustment unit 66 outputs information indicating this insufficiency to the extended link processing unit 64, and the convertible wireless device 15 transmits a signal requesting the addition of a link attached to communication property CP42 to the coordinator 30. This request is not a request for allocation of a new communication resource; it is a request for a change to an existing communication resource.

When the coordinator 30 receives this request from the convertible wireless device 15, it processes the request in the extended link management unit 34 (see FIG. 4), and, as shown in FIG. 17B, adds the number of extended links that communication property CP42 is allocated to. The information indicating extended links that has been changed in this manner is transmitted from the coordinator 30 to the convertible wireless device 15, and is processed in the extended link protocol processing unit 63. When the content of this process is reflected in the extended link processing unit 64, communication is performed using the updated extended links (the two extended links that communication property CP42 is allocated to).

While the above description relates to an example where the bandwidth is increased by adding an extended link, the bandwidth can also be reduced by removing an extended link. It is also possible to switch the modulation method to one other than adjusting the bandwidth by increasing or reducing the bandwidth. When switching the modulation method, information indicating the modulation method is stored in the template database DB1 and the communication property database DB2. Moreover, when the modulation methods have different bandwidths, information indicating the occupy bandwidth of each modulation method can be stored in the template database DB1, and the extended link management unit 34 of the coordinator 30 can refer to this information when performing processing.

Figure 18:
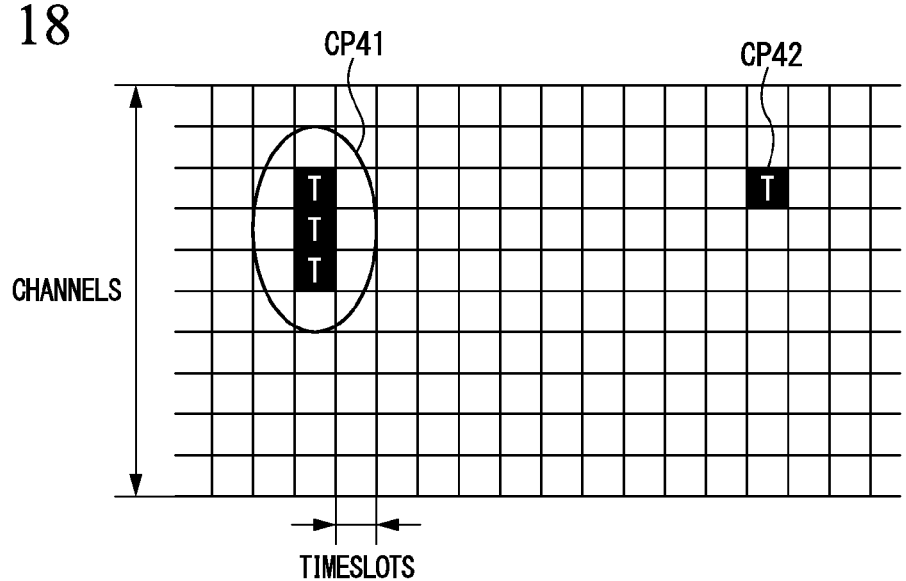
FIG. 18 is an explanatory diagram illustrating modulation method switching in accordance with the sixth preferred embodiment of the present invention.

FIG. 18 is an explanatory diagram illustrating modulation method switching in accordance with the sixth preferred embodiment of the present invention. In FIG. 18, the three extended links with the same communication property CP41 allocated to them use a modulation method defined by, for example, Wi-Fi (Registered Trademark), and the extended link with communication property CP42 allocated to it uses a modulation method defined by, for example, IEEE802.15.4. In the sixth preferred embodiment, it is possible to switch between such different modulation methods.

The maximum transmission unit (MTU: the maximum unit of data that can be transmitted in one transfer) may differ according to the communication media. For example, when the convertible wireless device 15 functions as a router device on the communication path and transfers packets, the MTU set in the wireless device which is the transmission source of the data may be larger than the MTU set in the convertible wireless device 15. In that case, preferably, the bandwidth adjustment unit 66 detects the size of the packet and changes the MTU according to the detected size of the packet. Methods for changing the MTU include: a method where the convertible wireless device 15 directly notifies the wireless device which is the transmission source that the packet size is excessive, and a method where the convertible wireless device 15 notifies the coordinator 30 that the packet size is excessive, and the coordinator 30 sets the MTU in the wireless device which is the transmission source.

(Seventh Preferred Embodiment)

Figure 19:
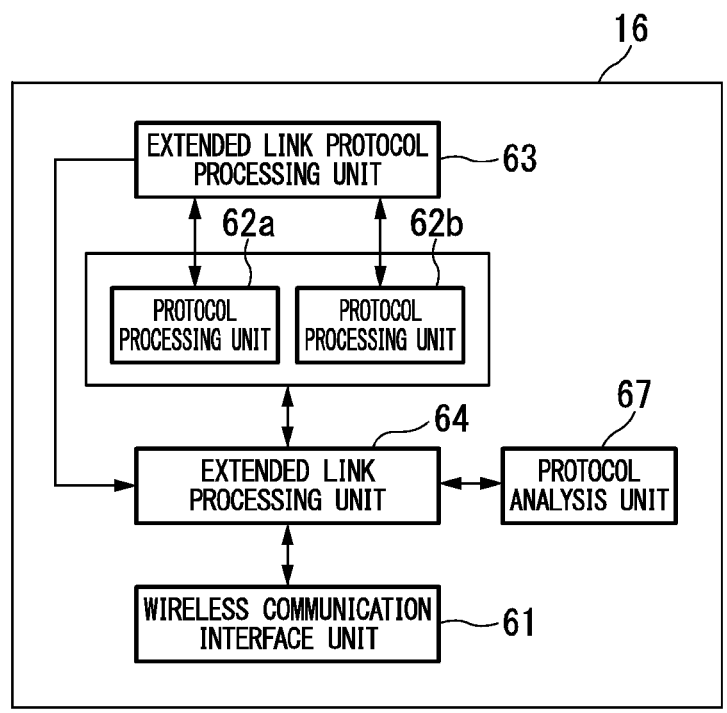
FIG. 19 is a block diagram illustrating the main constitutive part of a convertible wireless device in accordance with a seventh preferred embodiment of the present invention.

FIG. 19 is a block diagram illustrating the main constitutive part of a convertible wireless device in accordance with a seventh preferred embodiment of the present invention. As shown in FIG. 19, a convertible wireless device 16 in the seventh preferred embodiment is configured by adding a protocol analysis unit 67 to the convertible wireless device 13 shown in FIG. 3B, and includes the function of an advertisement router similar to the convertible wireless device 13c shown in FIG. 8. The convertible wireless device 16 with this configuration can analyze communication protocols used by a wireless device that made a request to join.

As was described using FIG. 8, the convertible wireless device 13c including the function of an advertisement router can supply an advertisement A1 for a communication protocol compliant with ISA100.11a ('communication protocol A') and an advertisement A2 for a communication protocol compliant with WirelessHART (Registered Trademark) ('communication protocol C'). Normally, since the frame format of advertisements is different for each communication protocol, a wireless device cannot receive an advertisement for a communication protocol that is different from the one it is using. Therefore, if the coordinator 30 and the convertible wireless device 13c refer to the links that the wireless device used in transmitting the join requests J1 and J2, they can ascertain the communication protocol that the wireless device is using.

However, in a case where the advertisements are compatible even though the communication protocols are different (e.g. when the communication protocols differ only that they are different versions), the wireless device can receive both advertisements for the communication protocol that it is using and advertisements for a different version of that communication protocol. Since such a wireless device can make a join request using any of the advertisements, the communication protocol the wireless device is using cannot be ascertained simply by referring to the link that it used to transmit the join request. By using the convertible wireless device 16 including the protocol analysis unit 67, the seventh preferred embodiment makes it possible to analyze the communication protocol being used by the wireless device that made a join request, even in a case such as this.

Figure 20:
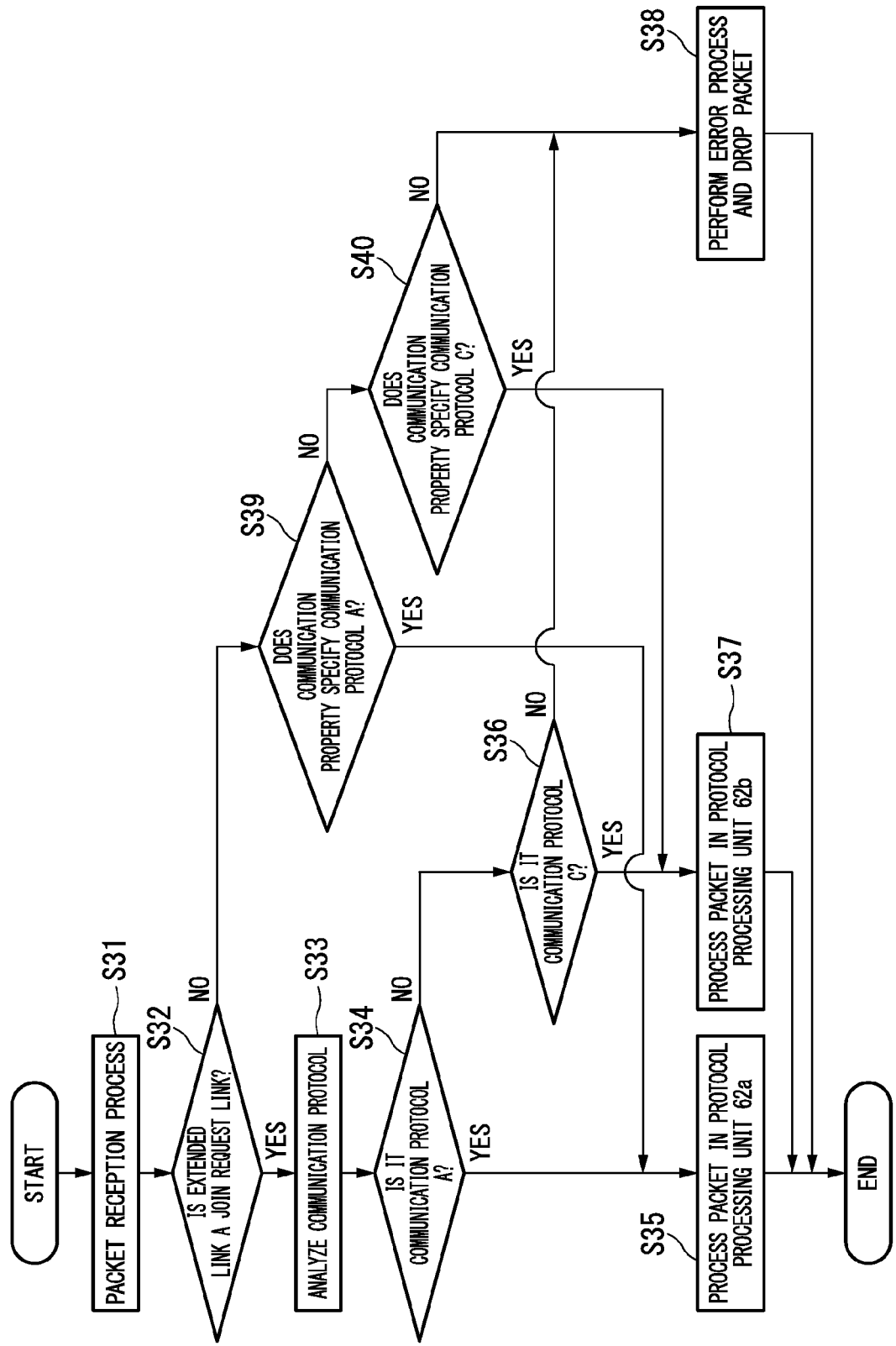
FIG. 20 is a flowchart illustrating an operation of a convertible wireless device in accordance with the seventh preferred embodiment of the present invention.

FIG. 20 is a flowchart illustrating an operation of a convertible wireless device in accordance with the seventh preferred embodiment of the present invention. The processing of the flowchart of FIG. 20 starts when a packet is input to the convertible wireless device 16. When processing starts, the wireless communication interface unit 61 of the convertible wireless device 16 subjects the packet to a reception process (step S31). The extended link processing unit 64 then determines whether the extended link used in transmitting the packet that was subjected to the reception process is a join request link (an extended link used in transmitting and receiving join requests) (step S32).

When it is determined that the extended link is a join request link (when the determination result of step S32 is 'YES'), the protocol analysis unit 67 analyzes the communication protocol used in transmitting and receiving the packet (step S33), and determines whether this communication protocol is 'communication protocol A' (step S34). When the protocol analysis unit 67 determines that it is 'communication protocol A' (when the determination result of step S34 is 'YES'), the packet that was received at the convertible wireless device 16 is processed in the protocol processing unit 62a (step S35).

When it is determined that the communication protocol used in transmitting and receiving the packet is not 'communication protocol A' (when the determination result in step S34 is 'NO'), the protocol analysis unit 67 determines whether the communication protocol is 'communication protocol C' (step S36). When the protocol analysis unit 67 determines that it is 'communication protocol C' (when the determination result of step S36 is 'YES'), the packet that was received at the convertible wireless device 16 is processed in the protocol processing unit 62b (step S37). When the protocol analysis unit 67 determines that the communication protocol used in transmitting and receiving the packet is not 'communication protocol C' (when the determination result in step S36 is 'NO'), it performs an error process and drops the packet (step S38).

On the other hand, in step S32, when the extended link processing unit 64 determines that the extended link is not a join request link (when the determination result of step S32 is 'NO'), it acquires the communication protocol specified in the communication property set in the extended link that was used in transmitting the packet, and determines whether it is 'communication protocol A' (step S39). When it determines that it is 'communication protocol A' (when the determination result of step S39 is 'YES'), the packet that was received at the convertible wireless device 16 is processed in the protocol processing unit 62a (step S35).

In contrast, when it is determined not to be 'communication protocol A' (when the determination result of step S39 is 'NO'), the extended link processing unit 64 determines whether the communication protocol is 'communication protocol C' (step S40). When it is determined to be 'communication protocol C' (when the determination result of step S40 is 'YES'), the packet that was received at the convertible wireless device 16 is processed in the protocol processing unit 62b (step S37). When it is determined in step S40 not to be 'communication protocol C' (when the determination result is 'NO'), the protocol analysis unit 67 performs an error process and drops the packet (step S38).

As described above, since the seventh preferred embodiment uses the convertible wireless device 16 including the protocol analysis unit 67, even if the convertible wireless device 16 supplies advertisements using communication protocols which are different yet have compatible advertisements, it is possible to analyze the communication protocol used by a wireless device that has made a join request. Therefore, a packet transmitted from the wireless device that made the join request can be processed appropriately, and problems arising from differences in the versions of the communication protocols can be prevented.

(Eighth Preferred Embodiment)

FIG. 21 is a diagram illustrating one example of a communication property database used in an eighth preferred embodiment of the present invention. As shown in FIG. 21, a communication property database DB2 used in the eighth preferred embodiment includes the communication property database DB2 of FIG. 5B with information indicating cryptographic keys (DL keys) added to it. The cryptographic keys are used in a data link layer of an OSI reference model.

The example of FIG. 21 only shows the cryptographic keys that are used in communications between the convertible wireless device 13c of FIG. 2 and the backbone router 20b, the wireless device 11e, and the wireless device 12b. Specifically, 'Key A' is used in communications between the convertible wireless device 13c and the backbone router 20b, and between the convertible wireless device 13c and the wireless device 11e, while 'Key B' is used in communications between the convertible wireless device 13c and the wireless device 12b.

Thus, in the eighth preferred embodiment, the coordinator 30 manages the template database DB1 with the number of cryptographic keys that can be used simultaneously added to it, and the communication property database DB2 with cryptographic keys set in it, thereby making it possible to switch the cryptographic key in each link. It is therefore possible to use different cryptographic keys for two devices that are wirelessly communicating in the same wireless subnet. While this example is one where the number of cryptographic keys and the cryptographic keys are respectively added to the template database DB1 and the communication property database DB2, in addition, cryptographic algorithms supported by the wireless devices and the cryptographic algorithms they are actually using could also be respectively added.

In the third preferred embodiment, as described using FIG. 11, the wireless subnet N11, which is the original network, and the provisional wireless subnet N12 for OTA provisioning are separated to maintain security, and are connected by the convertible wireless device 14. However, in the eighth preferred embodiment, as described above, a different cryptographic key can be set for each communication peer belonging to the same wireless subnet, thereby making it possible to realize OTA provisioning without using the provisional wireless subnet N12.

Figure 22:
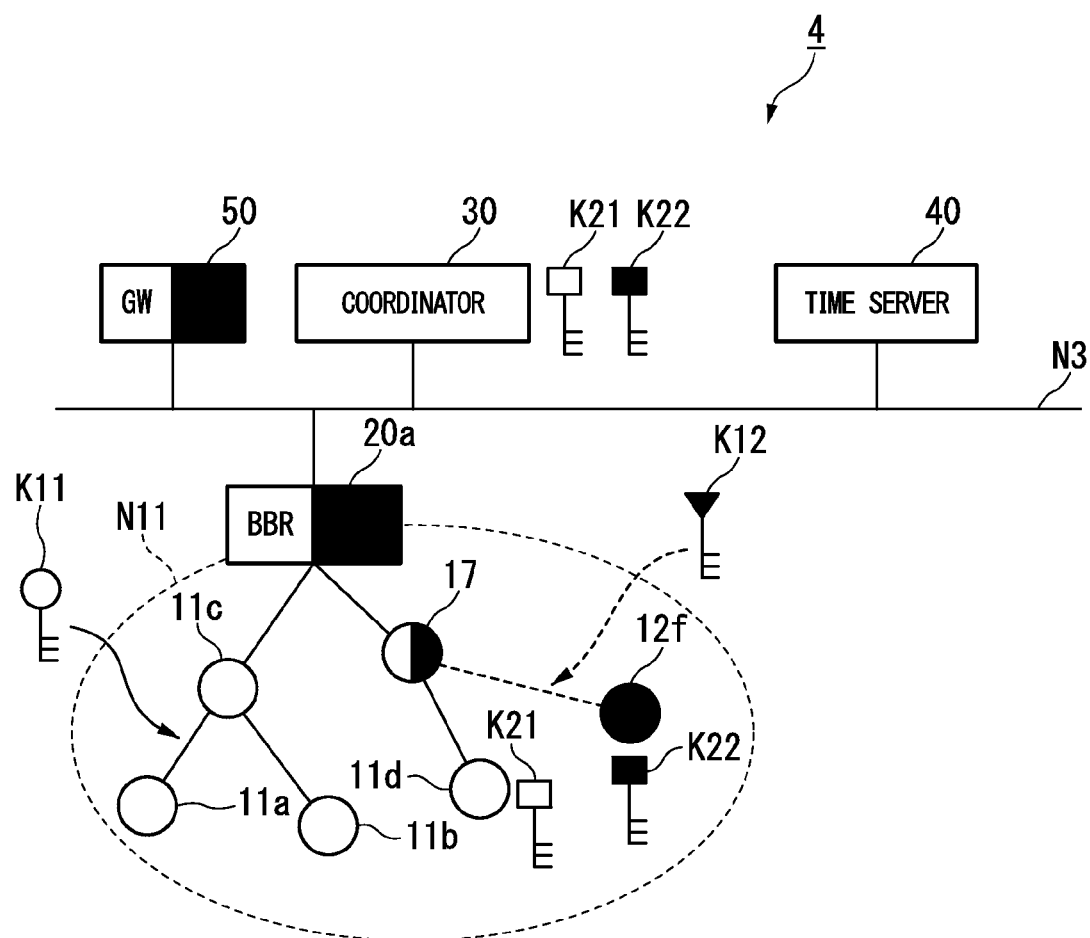
FIG. 22 is a diagram illustrating a communication system wherein the eighth preferred embodiment of the present invention has been applied.

FIG. 22 is a diagram illustrating a communication system wherein the eighth preferred embodiment of the present invention has been applied. In FIG. 22, blocks which are the same as those shown in FIG. 11 are designated with the same reference numerals. The communication system 4 shown in FIG. 22 includes a convertible wireless device 17 instead of the convertible wireless device 14 of the communication system 3 shown in FIG. 11, and uses two cryptographic keys K11 and K12 in communications performed in the wireless subnet N11.

The cryptographic key K11 is used in communications between the wireless devices 11a to 11d, the convertible wireless device 17, and the backbone router 20a forming the wireless subnet N11, and the cryptographic key K12 is used in communications between the convertible wireless device 17 and the wireless device 12f that is subjected to OTA provisioning. By using the two cryptographic keys K11 and K12 in the wireless subnet N11 in this way, it is possible maintain security while realizing OTA provisioning, without using the provisional wireless subnet N12.

While the management apparatus and communication system in accordance with preferred embodiments of the present invention have been described above, the present invention is not limited to the foregoing preferred embodiments and can be freely modified within the scope of the present invention. For example, in the example described in the foregoing preferred embodiments, the convertible wireless device includes a protocol processing unit that processes an existing communication protocol, and an extended link protocol processing unit that sets extended links according to the existing communication protocol. However, it is acceptable to provide special processing units for setting properties for the extended links, and to switch between them. Furthermore, while in the example described in the foregoing preferred embodiments, a communication system performs wireless communications compliant with ISA100.11a and WirelessHART (Registered Trademark), the present invention is not limited to these standards, and can be applied in any wireless communication standard.

Furthermore, in the example described in the foregoing preferred embodiments, the backbone routers 20a to 20c, the coordinator 30, the time server 40, and the gateway 50 are separate devices. However, any two or more of these can be configured as a single device. Moreover, while in the example described in the foregoing preferred embodiments, the wireless devices 11a to 11e, the wireless devices 12a to 12e, the convertible wireless devices 13a to 13c, and such like are field devices, they are not limited to field devices.

INDUSTRIAL APPLICABILITY

The present invention can be applied to a management apparatus and a communication system that includes the management apparatus, and enables wireless communication via a wireless network even if there is a mixture of wireless communication devices having different specifications on that wireless network.

DESCRIPTION OF THE REFERENCE SYMBOLS 1 to 4 communication system
11 wireless device
11a to 11g wireless device
12 wireless device
12a to 12f wireless device
13 convertible wireless device
13a to 13d convertible wireless device
14 to 17 convertible wireless device
20a to 20c backbone router
30 coordinator
34 extended link management unit
CH channel
CP communication property
CP1, CP2 communication property
CP10 to CP14 communication property
CP21, CP22 communication property
CP31 to CP 33 communication property
CP41, CP42 communication property
D1, D2 wireless communication device
DB1 template database
DB2 communication property database
EL extended link
EL1, EL2 extended link
M management apparatus
N wireless network
N1, N2, N4 wireless network
N11, N12 wireless subnet
NL link
TS timeslot

The invention claimed is:

1. A management apparatus that manages a wireless communication network formed by a plurality of wireless communication devices capable of TDMA wireless communication and coupled to a backbone network, comprising:
protocol processing units operative to perform protocol processes according to predetermined wireless communication standards;
virtual interface units coupled to the protocol processing units and operative to identify communication protocols,
a backbone interface coupled to the virtual interface units and operative to transmit signals from the virtual interface units to the backbone network and receive signals transmitted from the backbone network and outputs the received signals to the virtual interface units, and
an extended link management unit configured to manage a plurality of extended links, each said extended link defining channels and timeslots used in the TDMA wireless communication, specifying a communication direction and setting respective property information characterizing the wireless communications performed by the wireless communication devices using the extended link,
wherein the property information contains at least one of: information indicating a communication protocol, a frequency channel, an antenna, a modulation, a cryptographic algorithm, and a cryptographic key, which are used in the wireless communication, information indicating the bandwidth of the wireless communication, and information indicating another wireless network to be connected to the wireless network.

2. The management apparatus according to claim 1, wherein the extended link management unit comprises:
a first database that stores information needed when setting property information for the wireless communication devices forming the wireless network; and
a second database that stores property information presently set for the wireless communication devices, and
the extended link management unit refers to the first and second databases in setting new property information for the wireless communication devices.

3. The management apparatus according to claim 2, wherein the extended link management unit also refers to the first and second databases in setting new property information for other wireless communication devices that communicate with the wireless communication devices.

4. A communication system capable of wireless communication via a wireless network, comprising:
a management apparatus that manages a wireless communication network; and
a plurality of wireless communication devices, with property information contained in extended links managed by the management apparatus having been set therein, the wireless communication devices performing TDMA wireless communication characterized according to the property information that has been set,
wherein the management apparatus includes an extended link management unit configured to manage the extended links, each extended link defining channels and timeslots used in the TDMA wireless communication, specifying a communication direction and setting respective property information characterizing the wireless communications performed by the wireless communication devices using the extended link,
wherein the property information contains at least one of: information indicating a communication protocol, a frequency channel, an antenna, a modulation, a cryptographic algorithm, and a cryptographic key, which are used in the wireless communication, information indicating the bandwidth of the wireless communication, and information indicating another wireless network to be connected to the wireless network.

5. The communication system according to claim 4, further comprising:
a wireless communication device that uses different communication protocols to advertise information needed to allow a wireless communication device that does not belong to the wireless network to join the wireless network.

6. The communication system according to claim 4, wherein
the extended link management unit comprises:
a first database that stores information needed when setting property information for the wireless communication devices forming the wireless network; and a second database that stores property information presently set for the wireless communication devices, and
the extended link management unit refers to the first and second databases in setting new property information for the wireless communication devices.

7. The communication system according to claim 6, wherein the extended link management unit also refers to the first and second databases in setting new property information for other wireless communication devices that communicate with the wireless communication devices.

8. A management method for managing a wireless communication network formed by a plurality of wireless communication devices capable of TDMA wireless communication, comprising:
managing extended links, each extended link defining channels and timeslots used in the TDMA wireless communication, specifying a communication direction and setting respective property information characterizing the wireless communications performed by the wireless communication devices using the extended link,
wherein the property information contains at least one of: information indicating a communication protocol, a frequency channel, an antenna, a modulation, a cryptographic algorithm, and a cryptographic key, which are used in the wireless communication, information indicating the bandwidth of the wireless communication, and information indicating another wireless network to be connected to the wireless network.

* * * * *